(12) United States Patent
Yu et al.

(10) Patent No.: US 12,460,105 B2
(45) Date of Patent: Nov. 4, 2025

(54) HYDROPHOBIC AND SUPERHYDROPHOBIC COATINGS AND METHODS THEREOF

(71) Applicant: Simon Fraser University, Burnaby (CA)

(72) Inventors: Hua-Zhong Yu, Burnaby (CA); Lishen Zhang, Burnaby (CA)

(73) Assignee: Simon Fraser University, Burnaby (CA)

(*) Notice: Subject to any disclaimer, the term of this patent is extended or adjusted under 35 U.S.C. 154(b) by 318 days.

(21) Appl. No.: 18/263,084

(22) PCT Filed: Jan. 26, 2022

(86) PCT No.: PCT/CA2022/050103
§ 371 (c)(1),
(2) Date: Jul. 26, 2023

(87) PCT Pub. No.: WO2022/160043
PCT Pub. Date: Aug. 4, 2022

(65) Prior Publication Data
US 2024/0084169 A1 Mar. 14, 2024

Related U.S. Application Data

(60) Provisional application No. 63/141,885, filed on Jan. 26, 2021.

(51) Int. Cl.
C09D 183/08 (2006.01)
C09D 5/16 (2006.01)
(Continued)

(52) U.S. Cl.
CPC ......... *C09D 183/08* (2013.01); *C09D 5/1681* (2013.01); *C09D 7/63* (2018.01); *C09D 7/70* (2018.01)

(58) Field of Classification Search
CPC ...... C09D 183/08; C09D 5/1681; C09D 7/63; C09D 7/70; C09D 7/20; C08G 77/24; C08K 5/5406
See application file for complete search history.

(56) References Cited

U.S. PATENT DOCUMENTS

| 5,599,445 | A | * | 2/1997 | Betz | ........................ | B01D 15/08 96/101 |
| 8,137,751 | B2 | * | 3/2012 | Bhushan | .................. | B05D 5/08 264/225 |

OTHER PUBLICATIONS

International Preliminary Report on Patentability for International Application No. PCT/CA2022/050103 (International Filing Date: Jan. 26, 2022), mailed Aug. 10, 2023 (5 pages).

(Continued)

*Primary Examiner* — Samir Shah
(74) *Attorney, Agent, or Firm* — Christensen O'Connor Johnson Kindness PLLC

(57) ABSTRACT

Hydrophobic and superhydrophobic coatings and articles coated with the hydrophobic and superhydrophobic coatings that exhibit superior hydrophobic properties. The hydrophobic or superhydrophobic coatings and the articles coated therewith can be made using unconventional methods, for example, based on a single-step, stoichiometrically-controlled hydrolysis and condensation reaction of organosilanes. The reaction can provide micro- to nano-scale hierarchical siloxane aggregates that are dispersible in solvents (e.g., organic solvents) to provide a coating mixture.

31 Claims, 21 Drawing Sheets

(51) Int. Cl.
*C09D 7/40* (2018.01)
*C09D 7/63* (2018.01)

(56) References Cited

OTHER PUBLICATIONS

International Search Report and Written Opinion for International Application No. PCT/CA2022/050103, filed Jan. 26, 2022, (6 pages).
Parikh, et al., "n-Alkylsiloxanes: From Single Monolayers to Layered Crystals. The Formatino of Crystalline Polymers from the Hydrolysis of n-Octadecyltrichlorosilane," J. Am. Chem. Soc., 119 (1997), 9 pages.
Ke et al., "Facile Preparation of Superhydrophobic Biomimetric Surface Based on Octadecyltrichlorosilane and Silica Nanoparticles," Applied Materials & Interfaces, (2010), 6 pages.

* cited by examiner

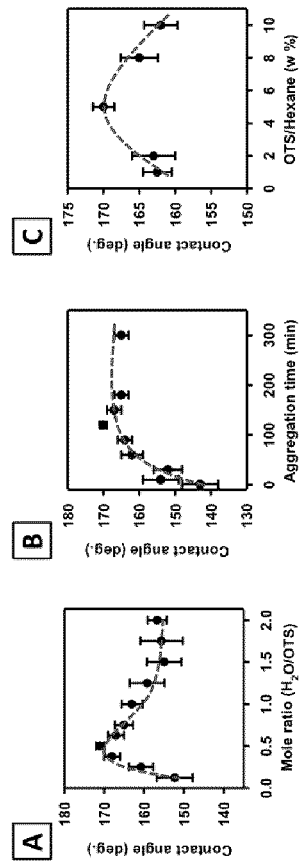
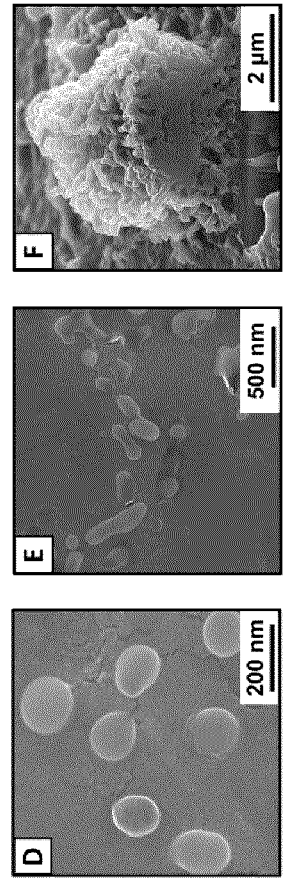
FIGURE 3A  FIGURE 3B  FIGURE 3C
FIGURE 3D  FIGURE 3E  FIGURE 3F

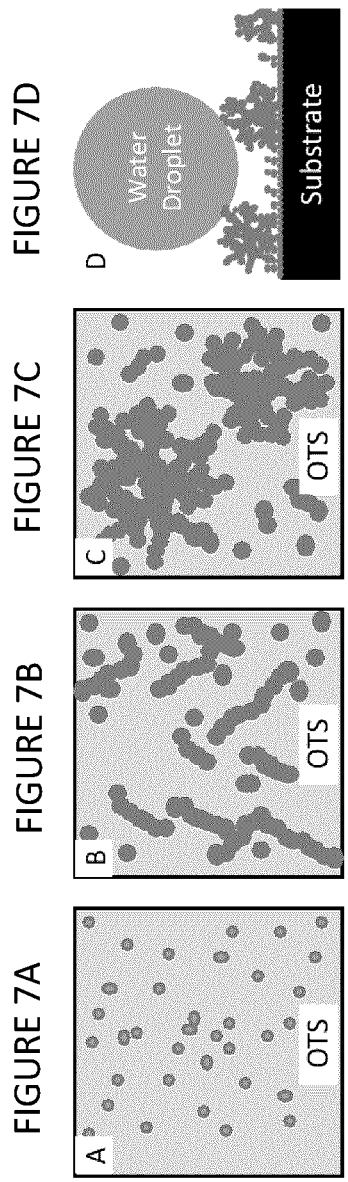

FIGURE 8A
FIGURE 8B
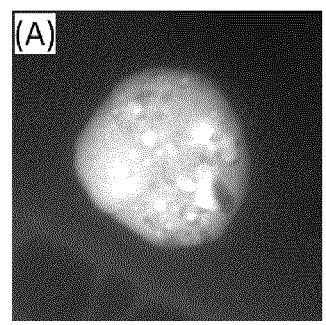 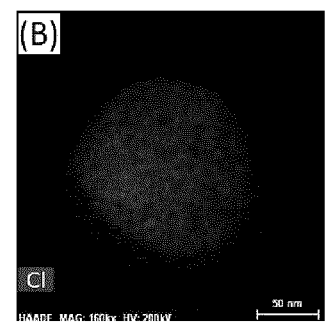

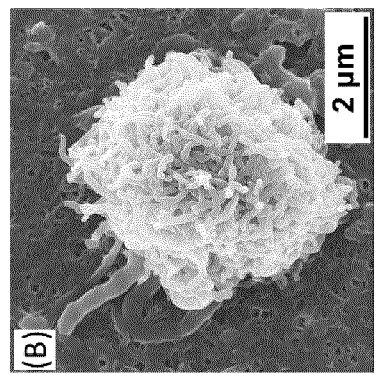
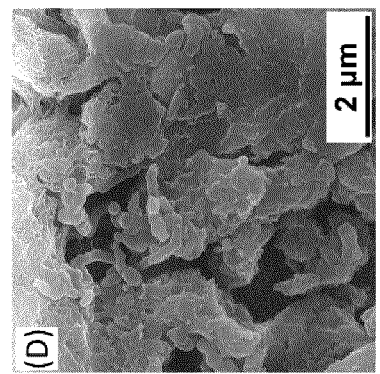
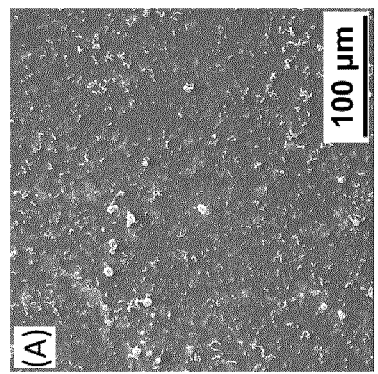
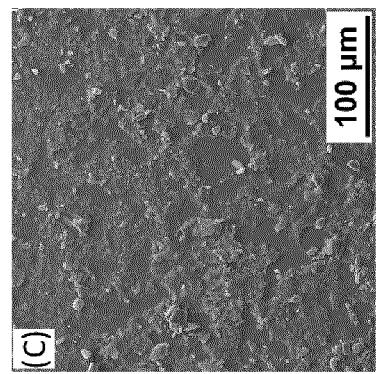
FIGURE 15A
FIGURE 15B
FIGURE 15C
FIGURE 15D

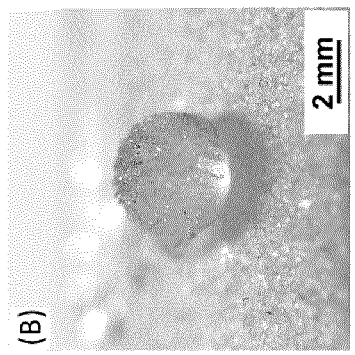
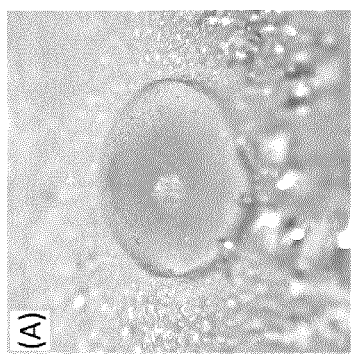
FIGURE 21A
FIGURE 21B

HYDROPHOBIC AND SUPERHYDROPHOBIC COATINGS AND METHODS THEREOF

CROSS-REFERENCE TO RELATED APPLICATION

This application is a National Stage of International Application No. PCT/CA2022/050103, filed Jan. 26, 2022, which claims the benefit of U.S. Provisional 63/141,885 filed on Jan. 26, 2021, the entire disclosures of which are hereby incorporated by reference.

BACKGROUND

Surface coating techniques to attain superhydrophobicity and waterproof capabilities have attracted both industrial and scientific interests. To achieve superhydrophobicity, the general strategy is to create micro-/nano-structures using materials of low surface tension. Existing coating methods reported to date rely on either replicating pre-existing "rough" structures or creating roughness on existing materials via multi-step procedures. However, the limited availability of ideal natural templates and accessible fabrication procedures is a significant challenge to achieving superhydrophobicity.

There is a need for hydrophobic and superhydrophobic coatings that are robust in real-life applications and for coating methods that are facile, low-cost, scalable, and environmental-friendly. The present disclosure fulfils these needs and provides further advantages.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In one aspect, the present disclosure features an article, including a hydrophobic coating that includes a microparticle. The microparticle is disposed on and covalently bound to a surface of the article. The microparticle can be porous and include a hierarchical morphology. The microparticle can include an agglomerated plurality of fibers, and the fiber can include a $C_{12}$-$C_{18}$ alkylhalosiloxane, a $C_6$-$C_{18}$ fluoroalkylhalosiloxane, or any combination thereof.

In another aspect, the present disclosure features a hydrophobic coating formulation, including a suspension that includes a microparticle suspended in a continuous phase. The microparticle can be porous and have a hierarchical morphology, the microparticle can include an agglomerated plurality of fibers, and the fiber can include a $C_{12}$-$C_{18}$ alkylhalosiloxane, a $C_6$-$C_{18}$ fluoroalkylhalosiloxane, or any combination thereof. The continuous phase can include an organic solvent, an alkyltrihalosilane, a fluoroalkyltrihalosilane or a combination thereof.

In yet another aspect, the present disclosure features a method of making a hydrophobic coating including: providing a mixture of water, together with a $C_{12}$-$C_{18}$ alkyltrihalosilane and/or a $C_6$-$C_{18}$ fluoroalkyltrihalosilane; mixing the mixture to provide an emulsion of nanodroplets that have a diameter of from 1 nm to 1000 nm; reacting the water and the $C_{12}$-$C_{18}$ alkyltrihalosilane and/or a $C_6$-$C_{18}$ fluoroalkyltrihalosilane in the mixture to provide a plurality of fibers that includes $C_{12}$-$C_{18}$ alkylhalosiloxane and/or $C_6$-$C_{18}$ fluoroalkylhalosiloxane; and agglomerating the plurality of fibers to provide porous microparticles suspended in $C_{12}$-$C_{18}$ alkyltrihalosilane and/or $C_6$-$C_{18}$ fluoroalkyltrihalosilane.

In yet another aspect, the present disclosure features a method of making a hydrophobic article, including: diluting a suspension of microparticles described herein in an organic solvent to provide a dilution of microparticles; and applying the dilution of microparticles to a surface of an article to provide the hydrophobic article.

DESCRIPTION OF THE DRAWINGS

The foregoing aspects and many of the attendant advantages of this disclosure will become more readily appreciated as the same become better understood by reference to the following detailed description, when taken in conjunction with the accompanying drawings, wherein:

FIG. 1A is a series of photographs showing an embodiment of a preparation of a coating formulation that can be applied on various solid substrates: (1) 2.0 mL of an embodiment of a pure $C_{12}$-$C_{18}$ alkyltrihalosilane was added with 40 µL of water; (2) upon mixing by vortex and sonication; (3) upon incubation for 2 h under ambient conditions; and (4) upon dilution with hexane (5% v/v alkyltrihalosilane/hexane).

FIG. 1B is a series of optical and scanning electron microscope (SEM) images of morphological characterization of a microscope glass slide treated with the coating formulation of FIG. 1A. The optical image on the left shows a water droplet (5.0 µL) on the surface (inset shows the measured water contact angle). The three SEM images show that the surface is covered with microparticles; these microparticles (2 µm to 20 µm) are formed of entangled and crosslinked nanofibers (width: 150 to 200 nm, length>2 µm).

FIGS. 3A-3F are a series of graphs and SEM images related to the fabrication and mechanistic investigation of an embodiment of coatings of the present disclosure.

FIG. 3A is a graph showing the obtained water contact angle on glass slides coated with embodiments of coating formulations of the present disclosure, as a function of the mole ratio of $H_2O$ to octadecyltrichlorosilane (OTS).

FIG. 3B is a graph showing the obtained water contact angle on glass slides coated with embodiments of coating formulations of the present disclosure, as a function of aggregation time.

FIG. 3C is a graph showing the obtained water contact angle on glass slides coated with embodiments of coating formulations of the present disclosure, as a function of dilution factor of the aggregated OTS in hexane.

FIG. 3D is an SEM image of an embodiment of hierarchical aggregates at a reaction stage.

FIG. 3E is an SEM image of an embodiment of hierarchical aggregates at a reaction stage different from that in FIG. 3D.

FIG. 3F is an SEM image of a cross-section of an embodiment of a microparticle of the present disclosure "anchored" on a substrate surface (cut with focused ion beam (FIB)).

FIG. 4A is a series of photographs of a drop of a fluorescent dye (pyranine) solution on a filter paper surface coated with an embodiment of a coating formulation of the present disclosure, the coating formulation further encapsulating a luminescent chromophore (Rhodamine B), under daylight (left) and UV lamp illumination (right).

FIG. 4B is a series of photographs demonstrating the self-cleaning property on a glass slide that has been coated with an embodiment of a coating formulation of the present disclosure.

FIG. 4C is a series of photographs demonstrating mechanical stability tests of modified glass slides that have been coated with an embodiment of a coating formulation of the present disclosure, with sand abrasion (left), and water jetting (right) tests. The insets show water contact angles measured on the surface after the tests.

FIG. 4D is a series of photographs showing a side view of water splashed off from a cotton T-shirt that has been coated with an embodiment of a coating formulation of the present disclosure (left); and water splashing test on a 0.3×0.5 m² piece of pine wood that has been sprayed with a coating formulation of the present disclosure (right).

FIGS. 7A-7D are a series of illustrations showing the formation of microparticles of the present disclosure.

FIG. 7A is an illustration of the formation of micelles (blue circles) when introducing water into an embodiment of a $C_{12}$-$C_{18}$ alkyltrihalosilane (grey matrix).

FIG. 7B is an illustration of the formation of nanoparticles (dark grey) resulting from the hydrolysis and condensation of an embodiment of a $C_{12}$-$C_{18}$ alkyltrihalosilane; the nanoparticles in turn form head-to-head linear fibers.

FIG. 7C is an illustration of the aggregation of the fibers of FIG. 7B to form the microparticles (dark grey).

FIG. 7D is side-view illustration of a surface that has been coated with a coating formulation of the present disclosure, with a water droplet on top.

FIG. 8A is a transmission electron microscope (TEM) image of a nanoparticle formed after the mixing step of an embodiment of the coating formulation preparation.

FIG. 8B is an image of the elemental mapping of chlorine (Cl) on the surface of the same nanoparticle as in FIG. 8A. The TEM image was consistent in size and morphology with the observation reported in FIG. 3D. The element mapping analysis demonstrated that halogen (e.g., Cl) still existed on the nanoparticle surface after the initial mixing. The existence of Cl indicates that the nanoparticles remained reactive to form, for example, head-to-head linear fibers.

FIG. 10A is a SEM image of a side view of an embodiment of a FIB-cut particle on a glass surface coated with an embodiment of a coating formulation of the present disclosure.

FIG. 10B is a graph of the energy dispersive X-Ray analysis (EDX) data showing the elemental composition of the red square area in of FIG. 10A. As gold salt was soluble in water and insoluble in organic solvents (e.g., hexane and a $C_{12}$-$C_{18}$ alkyltrihalosilane), the presence of Au in every nanofiber indicated that these fibers were formed from the sols.

FIG. 10C is a SEM image of the surface between embodiments of microparticles of the present disclosure (inset is the overlay of gold mapping with surface morphology).

FIG. 10D is a graph of the elemental composition of the overlay area of FIG. 10C with the gold peak clearly shown.

FIG. 15A is a SEM image of a glass surface that has been coated with an embodiment of a coating formulation of the present disclosure, before sand abrasion.

FIG. 15B is a higher magnification SEM image of a microparticle shown in FIG. 15A, before sand abrasion.

FIG. 15C is a SEM image of a glass surface that has been coated with an embodiment of a coating formulation of the present disclosure, after sand abrasion.

FIG. 15D is a higher magnification SEM image of a microparticle shown in FIG. 15D, after sand abrasion. Compared to FIGS. 15A and 15B, the abrasion process has partially removed the top layer of the original coating; the remaining surface, however, has a similar hierarchical nano/microstructure.

FIG. 17A is a schematic view of the gas permeation test set-up. The fabric piece was clamped in between two pieces of PDMS (polydimethylsiloxane) plates. A bigger square was cut on the top layer of PDMS, a smaller circle was cut on the bottom layer of PDMS. In the bottle below, 50 mg $Na_2S$ was added to a 0.1 M HCl solution; the generated $H_2S$ gas would permeate through the fabric, react with $CuSO_4$ trapped at the top PDMS plate (held by the coated cotton fabric and the PDMS plate).

FIG. 17B is a photograph of a top view of $CuSO_4$ solution before the reaction described herein for FIG. 17A.

FIG. 17C is a photograph of a top view of $CuSO_4$ solution after the reaction described herein for FIG. 17A. A dark circle formed after reaction, indicative of the formation of CuS. This result confirmed that the coated cotton fabric is gas permeable.

FIGS. 21A and 21B are photographs showing a comparative anti-icing test of an uncoated glass slide and a glass slide that has been coated with an embodiment of a coating formulation of the present disclosure. The slides were placed flat in a freezer (−20° C.). 30 μL of water were carefully dropped on the surface of both slides, ensuring that the droplets stayed stationary. The samples were subsequently stored in the freezer overnight to allow the droplets to freeze completely. Upon taking the samples out from the freezer, the anti-icing property was tested with a dual range force sensor (Vernier lab pro; Beaverton, OR) by measuring the adhesion force between the frozen droplet and the substrate surface.

FIG. 21A is a photograph of an anti-icing test for an uncoated glass slide. The diameter of droplet contact areas was 6.0 mm; the adhesive force was 895±69 kPa.

FIG. 21B is a photograph of a glass slide that has been coated with an embodiment of a coating formulation of the present disclosure. The diameter of droplet contact areas on two slides was 1.1 mm; the adhesive force decreased ~30% to 636±36 kPa.

DETAILED DESCRIPTION

Figures 1A, 1B:
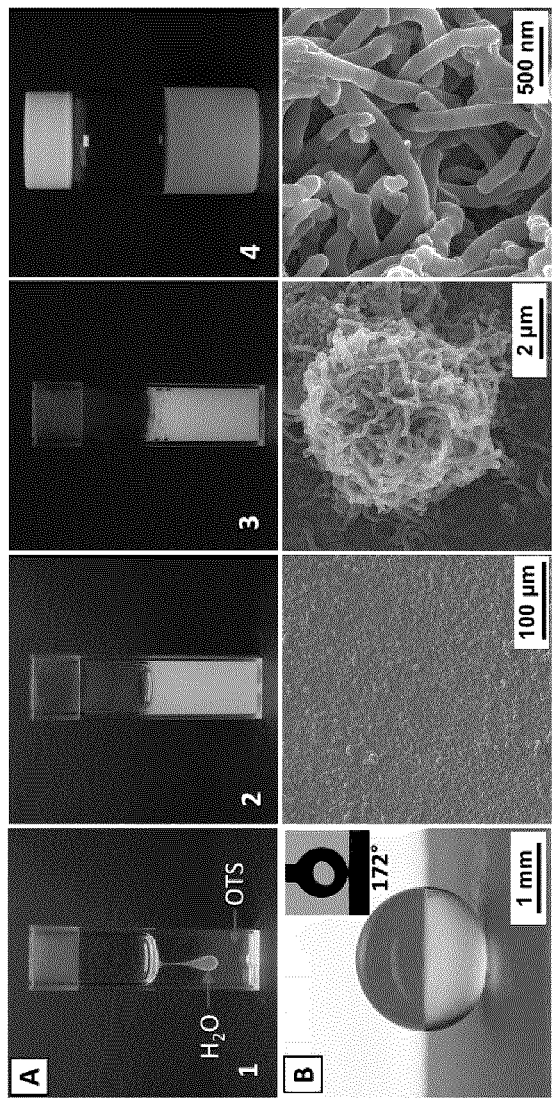
FIGS. 1A-B are photographs showing the fabrication and characterization of an embodiment of the superhydrophobic coatings of the present disclosure.

The present disclosure describes hydrophobic and superhydrophobic coatings and articles coated with the hydrophobic and superhydrophobic coatings that exhibit superior hydrophobic properties. The hydrophobic and superhydrophobic coatings and the articles coated therewith can be made using unconventional methods, for example, based on a single-step, stoichiometrically-controlled hydrolysis and condensation reaction of organosilanes. The reaction can provide micro- to nano-scale hierarchical siloxane aggregates that are dispersible in solvents (e.g., organic solvents) to provide a coating mixture. Excellent superhydrophobicity (e.g., ultrahigh water contact angle>170° and ultralow sliding angle<1°) can be attained on solid materials of various compositions and dimensions, for example, by coating (e.g., dipping or spraying) the article with the coating mixtures of the present disclosure. The hydrophobic and superhydrophobic coatings can have excellent properties such as waterproof capability, robustness, cost savings, scalability, and encapsulate other functional materials, such as luminescent dyes.

Definitions

At various places in the present specification, substituents of compounds of the disclosure are disclosed in groups or in ranges. It is specifically intended that the disclosure includes each and every individual subcombination of the members of such groups and ranges. For example, the term "$C_{1-6}$ alkyl" is specifically intended to individually disclose methyl, ethyl, $C_3$ alkyl, $C_4$ alkyl, $C_5$ alkyl, and $C_6$ alkyl.

It is further appreciated that certain features of the disclosure, which are, for clarity, described in the context of separate embodiments, can also be provided in combination in a single embodiment.

Conversely, various features of the disclosure which are, for brevity, described in the context of a single embodiment, can also be provided separately or in any suitable subcombination.

The verb "comprise" and its conjugations, are used in the open and non-limiting sense to mean that items following the word are included, but items not specifically mentioned are not excluded.

"About" in reference to a numerical value refers to the range of values somewhat less or greater than the stated value, as understood by one of skill in the art. For example, the term "about" could mean a value ranging from plus or minus a percentage (e.g., ±1%, ±2%, or ±5%) of the stated value. Furthermore, since all numbers, values, and expressions referring to quantities used herein are subject to the various uncertainties of measurement encountered in the art, then unless otherwise indicated, all presented values may be understood as modified by the term "about."

As used herein, the articles "a," "an," and "the" may include plural referents unless otherwise expressly limited to one-referent, or if it would be obvious to a skilled artisan from the context of the sentence that the article referred to a singular referent.

Where a numerical range is disclosed herein, then such a range is continuous, inclusive of both the minimum and maximum values of the range, as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all subranges subsumed therein. For example, a stated range of from "1 to 10" should be considered to include 1 and 10, and any and all subranges between the minimum value of 1 and the maximum value of 10. Exemplary subranges of the range "1 to 10" include, but are not limited to, e.g., 1 to 6.1, 3.5 to 7.8, and 5.5 to 10.

As used herein, the term "substituted," or "substitution" refers to the replacing of a hydrogen atom with a substituent other than H. For example, an "N-substituted piperidin-4-yl" refers to replacement of the H atom from the NH of the piperidinyl with a non-hydrogen substituent such as, for example, alkyl.

As used herein, the term "alkyl" refers to a saturated hydrocarbon group which is straight-chained (e.g., linear) or branched. Example alkyl groups include methyl (Me), ethyl (Et), propyl (e.g., n-propyl and isopropyl), butyl (e.g., n-butyl, isobutyl, t-butyl), pentyl (e.g., n-pentyl, isopentyl, neopentyl), and the like. An alkyl group can contain from 1 to about 30, from 1 to about 24, from 2 to about 24, from 1 to about 20, from 2 to about 20, from 1 to about 18, from 1 to about 10, from 1 to about 8, from 1 to about 6, from 1 to about 4, from 1 to about 3, from 4 to about 18, from about 10 to about 20, from 12 to about 18, from 14 to about 18, or from 16 to about 18 carbon atoms.

As used herein, the term "alkylene" refers to a linking alkyl group.

As used herein, the term "fluoroalkyl" refers to alkyl groups where one or more H is replaced with F. Fluoroalkyl groups can include 1 fluorine substituent up to perfluoroalkyl groups.

As used herein, the term "halo" or "halogen" includes fluoro, chloro, bromo, and iodo.

As used herein, "hierarchical morphology" refers to structures having nanoscale morphological features that in turn are present on microscale morphological features. An example of a hydrophobic surface having hierarchical morphology is the lotus leaf, where the presence of hierarchical structures is formed of nanoscale wax protrusions on microscale roughness.

As used herein, the term "hydrophilic" refers to a water contact angle of less than and not including 90°, which means that the water droplet wets the surface.

As used herein, the term "hydrophobic" refers to a material or surface with which water droplets have a contact angle in air of at least 90°, as measured by a contact angle goniometer. A hydrophobic surface can be substantially waterproof.

As used herein, the term "superhydrophobic" refers to a surface with which water droplets have a contact angle in air of at least 150°, as measured by a contact angle goniometer. A superhydrophobic surface can be completely waterproof.

As used herein, the term "water contact angle," "contact angle," or "static contact angle" refers to as the angle between a static drop of deionized water and a flat and horizontal surface upon which the droplet is placed. Water contact angles (WCA) can be measured with an optical goniometer (AST VCA system, Billerica, MA), where a 1.0 µL droplet is held with a syringe needle, and slowly moved down to contact the sample surface. At least three samples prepared under the same condition can be tested; and for each sample, 5 different regions can be examined.

As used herein, the term "nanoscale" morphological features or nanoscale features refers to a three-dimensional topography of features (e.g., fibers, particles, ridges, troughs, pits, mounds, etc.) having at least one dimension of less than 1 micron. Nanoscale morphological features can be disposed on or within, or otherwise aggregate to form a microscale feature, where the three-dimensional topography of microscale feature (e.g., a particle) have a minimum dimension of from 1 micron to 1000 microns.

As used herein, the term "covalently bound" refers to a substance that is linked to another via a covalent bond, which is a chemical bond that involves the sharing of electron pairs between atoms. These electron pairs are known as shared pairs or bonding pairs, and the stable balance of attractive and repulsive forces between atoms, when they share electrons, is known as covalent bonding.

As used herein, the term "crosslinking" refers to a bond that links one polymer chain, particle, or fiber to another. These links may take the form of covalent bonds or ionic bonds. In some embodiments, the links are covalent bonds.

As used herein, the term "self-cleaning" refers the property of a surface that generally keeps the surface clean without mechanical force or detergent to loosen and remove visual detractants (e.g., debris, contaminants, bacteria, and/or biofilm). The self-cleaning surface can have atilt angle of equal to or less than 10°.

As used herein, the term "tilt angle," "roll-off angle," or "sliding angle" refers to the smallest angle between a surface having a water droplet disposed thereon and the horizontal surface at which the droplet commences to and continues to roll off. Tilt angle and roll-off angle, as well as method of measuring them, are described, for example, in Superhydrophobic surfaces: from structural control to functional application, J. Mater. Chem., 2008, 18, 621-633, incorporated herein by reference in its entirety.

As used herein, the terms "anti-fouling" and "biofilm-resistant" are interchangeable and refer to a coating (as defined herein) that impairs, inhibits, prevents, or retards the attachment and/or growth of biofouling organisms.

As used herein, an "emulsion" refers to a mixture of two or more liquids that are normally immiscible owing to liquid-liquid phase separation.

As used herein, a "suspension" refers to a heterogeneous mixture in which the solute particles do not dissolve but are suspended throughout the bulk of the continuous phase (e.g., a solvent), and left floating around freely in the continuous phase.

As used herein, the term "coating" refers to a deposit layer applied to part or all of an exposed surface of a substrate.

As used herein, an "exposed surface" and "outer surface" refer to all accessible surface area of an object accessible to a liquid. The "exposed surface area" refers to the summation of all the areas of an article accessible to a liquid.

As used herein, the term "composite" refers to a composition material, a material made from two or more constituent materials with significantly different physical or chemical properties that, when combined, produce a material with characteristics different from the individual components. The individual components remain separate and distinct within the finished structure.

The compounds described herein can be asymmetric (e.g., having one or more stereocenters). All stereoisomers, such as enantiomers and diastereomers, are intended unless otherwise indicated.

Compounds of the disclosure can also include all isotopes of atoms occurring in the intermediates or final compounds. Isotopes include those atoms having the same atomic number but different mass numbers. For example, isotopes of hydrogen include tritium and deuterium.

In some embodiments, the compounds of the disclosure, and salts thereof, are substantially isolated. By "substantially isolated" is meant that the compound is at least partially or substantially separated from the environment in which it was formed or detected. Partial separation can include, for example, a composition enriched in the compound of the disclosure. Substantial separation can include compositions containing at least about 50%, at least about 60%, at least about 70%, at least about 80%, at least about 90%, at least about 95%, at least about 97%, or at least about 99% by weight of a given compound, or salt thereof. Methods for isolating compounds and their salts are routine in the art.

Unless otherwise defined, all technical and scientific terms used herein have the same meaning as commonly understood by one of ordinary skill in the art. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

It will be readily understood that the aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the FIGURES should not be viewed as limiting. It should be understood that other embodiments may include more or less of each element shown in a given FIGURE. Further, some of the illustrated elements may be combined or omitted. Yet further, an example embodiment may include elements that are not illustrated in the FIGURES.

Hydrophobic and Superhydrophobic Coatings and Coated Articles

The present disclosure features an article that includes a hydrophobic (e.g., a superhydrophobic) coating that is disposed, for example, on at least one surface of the article. The hydrophobic (e.g., superhydrophobic) coating includes a microparticle. The microparticle can be disposed on and covalently bound to a surface of the article. When viewed under magnification (e.g., with a scanning electron microscope or with a transmission electron microscope), the microparticle are porous and observed to have a hierarchical morphology. For example, the microparticle can be formed from an agglomerated plurality of fibers (e.g., nanofibers). The fiber (e.g., nanofiber) includes a $C_{12}$-$C_{18}$ alkylhalosiloxane, $C_6$-$C_{18}$ fluoroalkylhalosiloxane, or any combination thereof.

In some embodiments, the fiber (e.g., nanofiber) includes a mixture of $C_{12}$ alkylhalosiloxane, $C_{14}$ alkylhalosiloxane, $C_{16}$ alkylhalosiloxane, and/or $C_{18}$ alkylhalosiloxane (e.g., $C_{14}$ alkylhalosiloxane, $C_{16}$ alkylhalosiloxane, and/or $C_{18}$ alkylhalosiloxane; $C_{16}$ alkylhalosiloxane and/or $C_{18}$ alkylhalosiloxane; or a $C_{18}$ alkylhalosiloxane); In some embodiments, the fiber (e.g., nanofiber) consists essentially of, or consists of, the $C_{12}$-$C_{18}$ alkylhalosiloxane, or any combination thereof. In some embodiments, the fiber (e.g., nanofiber) consists essentially of, or consists of $C_{12}$ alkylhalosiloxane, $C_{14}$ alkylhalosiloxane, $C_{16}$ alkylhalosiloxane, and/or $C_{18}$ alkylhalosiloxane (e.g., $C_{14}$ alkylhalosiloxane, $C_{16}$ alkylhalosiloxane, and/or $C_{18}$ alkylhalosiloxane; $C_{16}$ alkylhalosiloxane and/or $C_{18}$ alkylhalosiloxane; or a $C_{18}$ alkylhalosiloxane). In some embodiments, the fiber (e.g., nanofiber) consists essentially of, or consists of, the $C_{12}$-$C_{18}$ alkylhalosiloxane, or any combination thereof.

In some embodiments, the fiber (e.g., nanofiber) includes a mixture of $C_6$ fluoroalkylhalosiloxane, $C_8$ fluoroalkylhalosiloxane, $C_{10}$ fluoroalkylhalosiloxane, $C_{12}$ fluoroalkylhalosiloxane, $C_{14}$ fluoroalkylhalosiloxane, $C_{16}$ fluoroalkylhalosiloxane, and/or $C_{18}$ fluoroalkylhalosiloxane (e.g., $C_6$ fluoroalkylhalosiloxane, $C_8$ fluoroalkylhalosiloxane, $C_{10}$ fluoroalkylhalosiloxane, $C_{12}$ fluoroalkylhalosiloxane, and/or $C_{14}$ fluoroalkylhalosiloxane; $C_6$ fluoroalkylhalosiloxane, $C_8$ fluoroalkylhalosiloxane, $C_{10}$ fluoroalkylhalosiloxane, and/or $C_{12}$ fluoroalkylhalosiloxane; $C_6$ fluoroalkylhalosiloxane and/or $C_8$ fluoroalkylhalosiloxane; or $C_8$ fluoroalkylhalosiloxane). In some embodiments, the fiber (e.g., nanofiber) consists essentially of, or consists of, the $C_6$-$C_{18}$ fluoroalkylhalosiloxane, or any combination thereof. In some embodiments, the fiber (e.g., nanofiber) consists essentially of, or consists of $C_6$ fluoroalkylhalosiloxane and/or $C_8$ fluoroalkylhalosiloxane. In some embodiments, the fiber (e.g., nanofiber) consists essentially of, or consists of, the $C_6$-$C_8$ fluoroalkylhalosiloxane, or any combination thereof. Examples of fluoroalkylhalosiloxanes include, (1H,1H,2H,2H-perfluorooctyl)halosiloxane, (1H,1H,2H,2H-perfluorododecyl)halosiloxane, (1H,1H,2H,2H-perfluorodecyl)halosiloxane, and the like.

In some embodiments, the $C_{12}$-$C_{18}$ alkylhalosiloxane includes one or more of $C_{12}$-$C_{18}$ alkylchlorosiloxane. In some embodiments, the fiber (e.g., nanofiber) includes a $C_{18}$ alkylhalosiloxane, such as a $C_{18}$ alkylchlorosiloxane.

In some embodiments, the $C_{12}$-$C_{18}$ alkylhalosiloxane includes one or more of $C_{12}$-$C_{18}$ alkylfluorosiloxane. In some embodiments, the fiber (e.g., nanofiber) includes a $C_{18}$ alkylhalosiloxane, such as a $C_{18}$ alkylfluorosiloxane.

The $C_{12}$-$C_{18}$ alkylhalosiloxane, or any one of $C_{12}$ alkylhalosiloxane, $C_{14}$ alkylhalosiloxane, $C_{16}$ alkylhalosiloxane, and $C_{18}$ alkylhalosiloxane, each independently can have less than 3 halo substituents per Si atom. In some embodiments, the ratio of the halo substituents to Si atom in the $C_{12}$-$C_{18}$ alkylhalosiloxane, or any one of $C_{12}$ alkylhalosiloxane, $C_{14}$ alkylhalosiloxane, $C_{16}$ alkylhalosiloxane, and $C_{18}$ alkylhalosiloxane, each independently is from 3:2 to 1:2. In certain embodiments, the $C_{12}$-$C_{18}$ alkylhalosiloxane, or any one of $C_{12}$ alkylhalosiloxane, $C_{14}$ alkylhalosiloxane, $C_{16}$ alkylhalosiloxane, and $C_{18}$ alkylhalosiloxane, each independently can have less than 0.5 halo substituent per Si atom (on average).

The $C_6$-$C_{18}$ fluoroalkylhalosiloxane, or any one of $C_6$ fluoroalkylhalosiloxane, $C_8$ fluoroalkylhalosiloxane, $C_{10}$ fluoroalkylhalosiloxane, $C_{12}$ fluoroalkylhalosiloxane, $C_{14}$ fluoroalkylhalosiloxane, $C_{16}$ fluoroalkylhalosiloxane, and/or Cis fluoroalkylhalosiloxane, each independently can have less than 3 halo substituents per Si atom (not counting the fluoro substituents on the alkyl groups). In some embodiments, the ratio of the halo substituents to Si atom (not counting the fluoro substituents on the alkyl groups) in the $C_6$-Cis fluoroalkylhalosiloxane, or any one of $C_6$ fluoroalkylhalosiloxane, $C_8$ fluoroalkylhalosiloxane, $C_{10}$ fluoroalkylhalosiloxane, $C_{12}$ fluoroalkylhalosiloxane, $C_{14}$ fluoroalkylhalosiloxane, $C_{16}$ fluoroalkylhalosiloxane, and/or Cis fluoroalkylhalosiloxane, each independently is from 3:2 to 1:2. In certain embodiments, the $C_6$-$C_{18}$ alkylhalosiloxane, or any one of $C_{12}$ alkylhalosiloxane, $C_{14}$ alkylhalosiloxane, $C_{16}$ alkylhalosiloxane, and $C_{18}$ alkylhalosiloxane, each independently can have less than 0.5 halo substituent per Si atom (on average, not counting the fluoro substituents on the alkyl groups).

In some embodiments, a given fiber in the microparticle can have an average diameter of from 50 nm to 10000 nm. In some embodiments, the nanofiber in the microparticle can have an average diameter of from 50 nm (e.g., from 100 nm, from 150 nm, from 200 nm, from 250 nm, from 300 nm, from 400 nm, from 500 nm, or from 750 nm) to less than 1000 nm (e.g., to 750 nm, to 500 nm, to 400 nm, to 300 nm, to 250 nm, to 200 nm, to 150 nm, or to 100 nm). In certain embodiments, the nanofiber in the microparticle has an average diameter of from 100 nm to 500 nm. In certain embodiments, the nanofiber in the microparticle has an average diameter of from 100 nm to 250 nm. The average diameter of the fiber can be calculated by measuring the diameter of 10 fibers and calculating the average of the measured diameters.

In some embodiments, the microparticle has an average diameter of from 0.1 μm (e.g., from 0.5 μm, from 1 μm, from 5 μm, from 10 μm, from 25 μm, from 50 μm, from 100 μm, from 250 μm, from 500 μm, from 750 μm) to 1000 μm (e.g., to 750 μm, to 500 μm, to 250 μm, to 100 μm, to 50 μm, to 25 μm, to 10 μm, to 5 μm, to 1 μm, or to 0.5 μm). In certain embodiments, the microparticle has an average diameter of from 0.5 μm to 500 μm. In certain embodiments, the microparticle has an average diameter of from 1 μm to 100 μm. The average diameter of a microparticle can be calculated by measuring the diameter of 10 microparticles and calculating the average of the measured diameters.

In some embodiments, the hydrophobic coating has a water contact angle of from 90° (e.g., from 120°, from 140°, from 160°, from 170°, from 175°, or from 179°) to 180° (e.g., to 179°, to 175°, to 170°, to 160°, to 140°, or to 120°). In certain embodiments, the superhydrophobic coating has a water contact angle of from 150° to 179°. In certain embodiments, the superhydrophobic coating has a water contact angle of from 150° to 175°.

In some embodiments, the hydrophobic coating has a sliding angle of from 0.05° (e.g., from 0.1°, from 0.15°, from 0.2°, from 0.25°, from 0.3°, from 0.35°, from 5°, from 10°, from 12°, from 14°, from 16°, from 18°, or from 20°) to 25° (e.g., to 20°, to 18°, to 16°, to 14°, to 12°, to 10°, to 5°, to 0.35°, to 0.3°, to 0.25°, to 0.2°, to 0.15°, or to 0.1°). In certain embodiments, the hydrophobic coating has a sliding angle of from 0.1° to 25°. In certain embodiments, the superhydrophobic coating has a water contact angle of from 150° to 179°. In some embodiments, the superhydrophobic coating has a sliding angle of from 0.1° (e.g., from 0.15°, from 0.2°, from 0.25°, from 0.3°, from 0.35°, from 5°, or from 8°) and/or to 10° (e.g., to less than 10°, to 8°, to 5°, to 0.35°, to 0.3°, to 0.25°, to 0.2°, to 0.15°, or to 0.10).

In some embodiments, the microparticle has pores having a maximum dimension of from 0.05 μm (e.g., from 0.1 μm, from 0.25 μm, from 0.5 μm, or 0.75 μm) to 1 μm (e.g., to 0.75 μm, to 0.5 μm, to 0.25 μm, or to 0.1 μm). In certain embodiments, the microparticle has pores having a maximum dimension of from 0.1 μm to 0.5 μm. The average maximum of a pore can be calculated by measuring the maximum size of 10 pores and calculating the average of the measured sizes.

The hydrophobic or superhydrophobic coating can include a density of from 1 (e.g., from about 100, from about 1,000, from about 5,000, from about 10,000, from about 25,000, from about 50,000, from about 100,000, from about 500,000, from about 1,000,000, from about 10,000,000, from about 500,000,000, or from about 1,000,000,000) to about 10,000,000,000 (e.g., to about 1,000,000,000, to about 500,000,000, to about 10,000,000, to about 1,000,000, to about 500,000, to about 100,000, to about 50,000, to about 25,000, to about 10,000, to about 5,000, to about 1,000, or to about 100) microparticles per square centimeter. In certain embodiments, the hydrophobic or superhydrophobic coating has a density of from about 1,000 to about 100,000,000 microparticles per square centimeter. In certain embodiments, the hydrophobic or superhydrophobic coating has a density of from about 10,000 to about 10,000,000 microparticles per square centimeter. The number of particles per square centimeter can be determined by counting the number of particles in 4 or more SEM images, averaging the value, and calculating the number of particles at the square centimeter area.

The fibers (e.g., nanofibers) can be physically entangled and/or chemically crosslinked, to provide the agglomerated fibers (e.g., nanofibers). In some embodiments, the fibers (e.g., nanofibers) are both physically entangled and chemically crosslinked (e.g., fibers or nanofibers linked to one another via covalent bonds).

The microparticles of the hydrophobic or superhydrophobic coating can be covalently-bound to the surface, cannot be washed away by more than 50% (e.g., by more than 40%, by more than 30%, by more than 20%, or by more than 10%) with a sand abrasion test or water jetting test (described below and in the Example), as observed by scanning electron microscopy. In some embodiments, the hydrophobic or superhydrophobic coating can maintain hydrophobicity or superhydrophobicity, respectively, after sand abrasion (4.5 kJ) for 10 min or water jetting (90 kJ) for 10 min. In some embodiments, water immersion for three days and tissue wiping for 20 times does not change the surface hydrophobicity by more than 20% (e.g., by more than 10%, by more than 5%, or by more than 2%). In some embodiments, the hydrophobic or superhydrophobic coating can be subjected to a standard abrasion test, where a coated article is pressed onto a piece of silicon carbide sandpaper (Grit No. 400) under a pressure of 2.5 kPa, and then abraded for a distance of 50 cm. The water contact angle can be maintained (e.g., have a change of less than 20%, less than 10%, less than 5%, less than 2%, or less than 1%) and/or maintain the sliding angle (e.g., have a change of less than 20%, less than 10%, less than 5%, less than 2%, or less than 1%) after the standard abrasion test.

In some embodiments, the microparticles of the hydrophobic or superhydrophobic coating can encapsulate a small molecule, such as a fluorescent dye or a luminophore, such that the small molecule can be entrapped on the surface of a coated article, when the microparticles of the hydrophobic or superhydrophobic coating are covalently bound to the surface of the coated article.

The surface that is coated with the hydrophobic or superhydrophobic coating can be any surface, such as a fabric surface, a paper/cardboard surface, a glass surface, a (synthetic or natural) wood surface, a plastic or polymer surface, a metal surface, a leather surface, a suede surface, a fiberglass surface, or any combination thereof. In some embodiments, the surface is porous and/or gas-permeable, such as a fabric or wood, and preserves the gas-permeability when coated with the hydrophobic or superhydrophobic coating. The articles can be any article where hydrophobicity or waterproofing properties are desirable, such as an article that includes a material such as fabric, glass, wood, plastic or polymer (e.g., nylon, polyester, acrylic), metal, leather, suede, fiberglass, paper, cardboard, natural and synthetic fibers (e.g., acrylic, wool, rayon, bamboo, cotton, spandex, elastane, polyester, angora, etc.). The articles can be, for example, clothing, a tent, a sleeping bag, an outdoor equipment, a shelter, a window, an awning, winter clothing, footwear, bags, headwear, knitted garments, wicking linings, bevy sacks, outdoor furniture, boat covers, sporting equipment, marine equipment (e.g., boats, buoys), a construction material, stone, concrete, wood, cement, steel, etc. The hydrophobic or superhydrophobic coating-coated article can be permeable to gas, such as oxygen and/or a water vapor, which can be advantageous for breathability and comfort (e.g., in the case of clothing).

In certain embodiments, the article that is coated with the hydrophobic or superhydrophobic coating is self-cleaning. In some embodiments, the article that is coated with the hydrophobic or superhydrophobic coating is non-fouling.

In some embodiments the article that is coated with the hydrophobic or superhydrophobic coating does not undergo a change of greater than 20% (e.g., greater than 15%, or greater than 10%) in microparticle shape, average microparticle size, and/or average microparticle density; does not undergo a change of greater than 10% (e.g., a change of greater than 5%, a change of greater than 2%, or a change of greater than 1%) in water contact angle; and/or a does not undergo a change of greater than 1000% (e.g., greater than 500%, greater than 100%, greater than 50%, greater than 20%, greater than 10%, greater than 5%, or greater than 2%) in sliding angle, upon storage under ambient conditions for an extended period of time (e.g., for at least 12 months, at least 18 months, or at least 24 months and/or up to 48 months, up to 36 months, or up to 24 months). As used herein, ambient conditions refer to a temperature of between 20° C. to 25° C., at 1 atmosphere, under full-spectrum daylight, and at a humidity of 10% to 80%.

Coating Formulations

The present disclosure features a hydrophobic or superhydrophobic coating formulation, including a suspension that includes a microparticle (e.g., a plurality of microparticles) suspended in a continuous phase. The microparticle is as described herein in the section entitled "Hydrophobic and Superhydrophobic Coatings and Coated Articles." For example, the microparticle can be porous and include a hierarchical morphology; the microparticle can include an agglomerated plurality of fibers (e.g., nanofibers), and the fibers (e.g., nanofibers) can include a $C_{12}$-$C_{18}$ alkylhalosiloxane, $C_6$-$C_{18}$ fluoroalkylhalosiloxane, or any combination thereof.

The continuous phase can include an organic solvent, an alkyltrihalosilane, a fluoroalkyltrihalosilane, or a combination thereof. For example, the organic solvent can include hexanes, mineral spirits, petroleum ether, toluene, ethyl acetate, acetone, dichloromethane, and/or chloroform, or any organic solvent that is volatile at 21° C. and at 1 atm. For example, the organic solvent can have a boiling point of less than 300° C. and a vapor pressure of about 100 Pa to 10 MPa. The continuous phase does not dissolve the microparticles. The alkyltrihalosilane can include a $C_{12}$-$C_{18}$ alkyltrihalosilane. The fluoroalkyltrihalosilane can include a $C_6$-$C_{18}$ fluoroalkyltrihalosilane. Examples of fluoroalkyltrihalosilanes include, (1H,1H,2H,2H-perfluorooctyl)halosilane, (1H,1H,2H,2H-perfluorododecyl)halosilane, (1H,1H,2H,2H-perfluorodecyl)halosilane, and the like.

In some embodiments, the microparticles are present in the suspension at a concentration of from 0.1% m/m (e.g., from 0.2% m/m, from 0.5% m/m, from 1% m/m, from 5% m/m, from 10% m/m, from 20% m/m, from 30% m/m, or from 40% m/m) to 50% m/m (e.g., to 40% m/m, to 30% m/m, to 20% m/m, to 10% m/m, to 5% m/m, to 1% m/m, to 0.5% m/m, or to 0.2% m/m), where % m/m refers to the mass of the microparticles relative to the mass of the suspension. In certain embodiments, the microparticles are present in the suspension at a concentration of from 0.1% m/m to 50% m/m (e.g., from 0.2% m/m to 30% m/m, or from 0.5% m/m to 20% m/m), where % m/m refers to the mass of the microparticles relative to the mass of the suspension.

Methods of Making the Hydrophobic or Superhydrophobic Coatings

The present disclosure also describes methods of making a hydrophobic or superhydrophobic coating. The method includes providing a mixture of water and a $C_{12}$-$C_{18}$ alkyltrihalosilane, water and a $C_6$-$C_{18}$ fluoroalkyltrihalosilane, or water and a $C_{12}$-$C_{18}$ alkyltrihalosilane and a $C_6$-$C_{18}$ fluoroalkyltrihalosilane; mixing the mixture to provide an emulsion of droplets (e.g., nanodroplets), reacting the water and the $C_{12}$-$C_{18}$ alkyltrihalosilane and/or $C_6$-$C_{18}$ fluoroalkyltrihalosilane in the mixture to provide a plurality of fibers (e.g., nanofibers) including a $C_{12}$-$C_{18}$ alkylhalosiloxane and/or $C_6$-$C_{18}$ fluoroalkylhalosiloxane, and agglomerating the plurality of fibers (e.g., nanofibers) to provide a suspension of porous microparticles in a continuous phase of the $C_{12}$-$C_{18}$ alkyltrihalosilane and/or $C_6$-$C_{18}$ fluoroalkyltrihalosilane.

In some embodiments, the droplets (e.g., nanodroplets) have a diameter of from 1 nm (e.g., from 5 nm, from 10 nm, from 25 nm, from 50 nm, from 100 nm, from 250 nm, from 500 nm, from 750 nm, or from 900 nm) to 1000 nm (e.g., to 900 nm, to 750 nm, to 500 nm, to 250 nm, to 100 nm, to 50 nm, to 25 nm, to 10 nm, or to 5 nm). In certain embodiments, the nanodroplets have a diameter of from 10 nm to 500 nm. In certain embodiments, the nanodroplets have a diameter of from 50 nm to 250 nm. The diameter of the droplets in solution can be determined using dynamic light scattering.

In some embodiments, the emulsion includes water nanodroplets in a continuous phase of the $C_{12}$-$C_{18}$ alkyltrihalosilane. The $C_{12}$-$C_{18}$ alkyltrihalosilane continuous phase can include any one of the $C_{12}$-$C_{18}$ alkyltrihalosilane; or can include a mixture of $C_{12}$ alkyltrihalosilane, $C_{14}$ alkyltrihalosilane, $C_{16}$ alkyltrihalosilane, and/or $C_{18}$ alkyltrihalosilane (e.g., $C_{14}$ alkyltrihalosilane, $C_{16}$ alkyltrihalosilane, and/or $C_{18}$ alkyltrihalosilane; $C_{16}$ alkyltrihalosilane, and/or $C_{18}$ alkyltrihalosilane; or $C_{18}$ alkyltrihalosilane). In some embodiments, the fiber (e.g., nanofiber) consists essentially of, or consists of, the $C_{12}$-$C_{18}$ alkylhalosiloxane, or any combination thereof. In some embodiments, the continuous phase consists essentially of, or consists of, a mixture of $C_{12}$ alkyltrihalosilane, $C_{14}$ alkyltrihalosilane, $C_{16}$ alkyltrihalosilane, and/or $C_{18}$ alkyltrihalosilane (e.g., $C_{14}$ alkyltrihalosilane, $C_{16}$ alkyltrihalosilane, and/or $C_{18}$ alkyltrihalosilane; $C_{16}$ alkyltrihalosilane, and/or $C_{18}$ alkyltrihalosilane; or $C_{18}$ alkyltrihalosilane). In some embodiments, the continuous phase consists essentially of, or consists of, the $C_{12}$-$C_{18}$ alkyltrihalosilane, or any combination thereof.

In some embodiments, the emulsion includes water nanodroplets in a continuous phase of the $C_6$-$C_{18}$ fluoroalkyltrihalosilane. The continuous phase of the $C_6$-$C_{18}$ fluoroalkyltrihalosilane can include any one of $C_6$-$C_{18}$ fluoroalkyltrihalosilane, or a mixture of $C_6$ fluoroalkyltrihalosilane, $C_8$ fluoroalkyltrihalosilane, $C_{10}$ fluoroalkyltrihalosilane, $C_{12}$ fluoroalkyltrihalosilane, $C_{14}$ fluoroalkyltrihalosilane, $C_{16}$ fluoroalkyltrihalosilane, and/or $C_{18}$ fluoroalkyltrihalosilane (e.g., $C_6$ fluoroalkyltrihalosilane, $C_8$ fluoroalkyltrihalosilane, $C_{10}$ fluoroalkyltrihalosilane, $C_{12}$ fluoroalkyltrihalosilane, and/or $C_{14}$ fluoroalkyltrihalosilane; $C_6$ fluoroalkyltrihalosilane, $C_8$ fluoroalkyltrihalosilane, $C_{10}$ fluoroalkyltrihalosilane, and/or $C_{12}$ fluoroalkyltrihalosilane; $C_6$ fluoroalkyltrihalosilane and/or $C_8$ fluoroalkyltrihalosilane; or $C_8$ fluoroalkyltrihalosilane). In some embodiments, the continuous phase consists essentially of, or consists of, the $C_6$-$C_{18}$ fluoroalkyltrihalosilane, or any combination thereof. In some embodiments, the continuous phase consists essentially of, or consists of $C_6$ fluoroalkyltrihalosilane and/or $C_8$ fluoroalkyltrihalosilane. In some embodiments, the continuous phase consists essentially of, or consists of, the $C_6$-$C_8$ fluoroalkyltrihalosilane, or any combination thereof. Examples of fluoroalkyltrihalosilanes include, trichloro(1H,1H,2H,2H-perfluorooctyl)silane, trichloro (1H,1H,2H,2H-perfluorododecyl)silane, trichloro (1H,1H,2H,2H-perfluorodecyl)silane, and the like.

The mixture of water and $C_{12}$-$C_{18}$ alkyltrihalosilane (or the mixture of water and $C_6$-$C_{18}$ fluoroalkyltrihalosilane, or the mixture of water with $C_{12}$-$C_{18}$ alkyltrihalosilane and $C_6$-$C_{18}$ fluoroalkyltrihalosilane) can have a mole ratio of from 0.01:1 (e.g., from 0.05:1, from 0.1:1, from 0.5:1, from 1:1, from 3:1, or from 5:1) to 10:1 (e.g., to 5:1, to 3:1, to 1:1, to 0.5:1, to 0.1:1, or to 0.05:1) water:$C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane). In some embodiments, the mixture can include a water:$C_{12}$-$C_{18}$ alkyltrihalosilane (or a water:$C_6$-$C_{18}$ fluoroalkyltrihalosilane; or a water:($C_{12}$-$C_{18}$ alkyltrihalosilane+$C_6$-$C_{18}$ fluoroalkyltrihalosilane)) mole ratio of from 0.01:1 to 5:1. In certain embodiments, the mixture can include a water:$C_{12}$-$C_{18}$ alkyltrihalosilane (or a water:$C_6$-$C_{18}$ fluoroalkyltrihalosilane; or a water:($C_{12}$-$C_{18}$ alkyltrihalosilane+$C_6$-$C_{18}$ fluoroalkyltrihalosilane)) mole ratio of from 0.01:1 to 3:1. In some embodiments, the mixture includes a mole ratio of 1:2 water:$C_{12}$-$C_{18}$ alkyltrihalosilane (or a water:$C_6$-$C_{18}$ fluoroalkyltrihalosilane; or a water:($C_{12}$-$C_{18}$ alkyltrihalosilane+$C_6$-$C_{18}$ fluoroalkyltrihalosilane)).

The mixture can include from 0.01% (e.g., from 0.02%, from 0.05%, from 0.1%, from 0.25%, from 0.5%, from 1%, from 3%, from 5%, from 7%, or from 9%) to 10% (e.g., to 9%, to 7%, to 5%, to 3%, to 1%, to 0.5%, to 0.25%, to 0.1%, to 0.05%, to 0.02%) by volume of water in $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane). In some embodiments, the mixture includes from 0.01% to 8.00% by volume of water in $C_{12}$-$C_{18}$ alkyltrihalosilane (or $C_6$-$C_{18}$ fluoroalkyltrihalosilane). In certain embodiments, the mixture includes from 0.01% to 5.00% by volume of water in $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane). In certain embodiments, the mixture includes 2% by volume of water in $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane).

In any of the embodiments herein, the $C_{12}$-$C_{18}$ alkyltrihalosilane can include a $C_{12}$-$C_{18}$ alkyltrichlorosilane. In some embodiments, the continuous phase includes a $C_{18}$ alkyltrihalosilane, such as a $C_{18}$ alkyltrichlorosilane.

In any of the embodiments herein, the $C_{12}$-$C_{18}$ alkyltrihalosilane can include a $C_{12}$-$C_{18}$ alkyltrifluorosilane. In some embodiments, the continuous phase includes a $C_{18}$ alkyltrihalosilane, such as a $C_{18}$ alkyltrifluorosilane.

In any one of the embodiments herein, the $C_6$-$C_{18}$ fluoroalkyltrihalosilane can include a trichloro $C_6$-$C_{18}$ fluoroalkylsilane. In some embodiments, the continuous phase includes a trichloro $C_6$ fluoroalkylsilane, a trichloro $C_8$ fluoroalkylsilane, a trichloro $C_{10}$ fluoroalkylsilane, a trichloro $C_{10}$ fluoroalkylsilane, a trichloro $C_{12}$ fluoroalkylsilane, a trichloro $C_{14}$ fluoroalkylsilane, a trichloro $C_{16}$ fluoroalkylsilane, and/or a trichloro $C_{18}$ fluoroalkylsilane.

In some embodiments, the mixture of water and $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) can further include a small molecule to be encapsulated by the nanodroplets, and in turn the fibers (e.g., nanofibers) and microparticles. As used herein, a "small molecule" has a molecular weight of less than 2000 Daltons. Examples of small molecules include fluorescent dyes, colored molecules, luminophores, inorganic salts, graphite, metal nanoparticles, organic molecules, or inorganic molecules. In some embodiments, the mixture of water and $C_{12}$-$C_{18}$ alkyltrihalosilane (or water and $C_6$-$C_{18}$ fluoroalkyltrihalosilane; or water and $C_{12}$-$C_{18}$ alkyltrihalosilane and $C_6$-$C_{18}$ fluoroalkyltrihalosilane) can further include a molecule and/or particles to be encapsulated by the nanodroplets, such as graphene.

Mixing the mixture can include any method suitable to generate the emulsion including the nanodroplets in a continuous phase. For example, mixing the mixture can include one or more steps of vortexing at an rpm of from 10 (e.g., from 100, from 1,000, from 2,500, from 5,000, or from 7,500) to 10,000 (e.g., to 7,500, to 5,000 to 2,500, to 1,000, or 100) for a duration of from 0.1 second (s) (e.g., from 1 second, from 2 seconds, from 5 seconds, from 10 seconds, from 30 seconds, from 1 minute, from 5 minutes, from 10 minutes, from 30 minutes, from 45 minutes) to 1 hour (h) (e.g., to 45 minutes, to 30 minutes, to 10 minutes, to 5 minutes, to 1 minute, to 30 seconds, to 10 seconds, to 5 seconds, to 2 seconds, or to 1 second), and/or one or more steps of ultrasonicating at a frequency of from 5 kHz (e.g., from 10 kHz, from 15 kHz, from 18 kHz, from 30 kHz, from 100 kHz, from 1 MHz, or from 30 MHz) to 50 MHz (e.g., to 30 MHz, to 1 MHz, to 100 kHz, to 30 kHz, to 18 kHz, to 15 kHz, or to 10 kHz) for a duration of from 0.1 second (s) (e.g., from 1 second, from 2 seconds, from 5 seconds, from 10 seconds, from 30 seconds, from 1 minute, from 5 minutes, from 10 minutes, from 30 minutes, from 45 minutes) to 1 hour (h) (e.g., to 45 minutes, to 30 minutes, to 10 minutes, to 5 minutes, to 1 minute, to 30 seconds, to 10 seconds, to 5 seconds, to 2 seconds, or to 1 second). In some embodiments, mixing the mixture can include one or more steps of vortexing at an rpm of from 100 to 5000 (e.g., 500 to 5000) for a period of 1 second to 10 min (e.g., from 1 second to 1 minute), and/or one or more steps of ultrasonicating at a frequency of from 5 kHz (e.g., from 10 kHz, from 15 kHz, from 18 kHz, from 30 kHz, from 100 kHz, from 1 MHz, or from 30 MHz) to 50 MHz (e.g., to 30 MHz, to 1 MHz, to 100 kHz, to 30 kHz, to 18 kHz, to 15 kHz, or to 10 kHz) for a duration of from 1 second to 10 minutes (or from 1 second to 1 minute).

In some embodiments, mixing the mixture includes vortexing at an rpm of from 10 (e.g., from 100, from 1,000, from 2,500, from 5,000, or from 7,500) to 10,000 (e.g., to 7,500, to 5,000 to 2,500, to 1,000, or 100) for a duration of from 0.1 second (s) (e.g., from 1 second, from 2 seconds, from 5 seconds, from 10 seconds, from 30 seconds, from 1 minute, from 5 minutes, from 10 minutes, from 30 minutes, from 45 minutes) to 1 hour (h) (e.g., to 45 minutes, to 30 minutes, to 10 minutes, to 5 minutes, to 1 minute, to 30 seconds, to 10 seconds, to 5 seconds, to 2 seconds, or to 1 second); ultrasonicating at a frequency of from 5 kHz (e.g., from 10 kHz, from 15 kHz, from 18 kHz, from 30 kHz, from 100 kHz, from 1 MHz, or from 30 MHz) to 50 MHz (e.g., to 30 MHz, to 1 MHz, to 100 kHz, to 30 kHz, to 18 kHz, to 15 kHz, or to 10 kHz) for a duration of from 0.1 second (s) (e.g., from 1 second, from 2 seconds, from 5 seconds, from 10 seconds, from 30 seconds, from 1 minute, from 5 minutes, from 10 minutes, from 30 minutes, from 45 minutes) to 1 hour (h) (e.g., to 45 minutes, to 30 minutes, to 10 minutes, to 5 minutes, to 1 minute, to 30 seconds, to 10 seconds, to 5 seconds, to 2 seconds, or to 1 second); then vortexing the mixture at an rpm of from 10 (e.g., from 100, from 1,000, from 2,500, from 5,000, or from 7,500) to 10,000 (e.g., to 7,500, to 5,000 to 2,500, to 1,000, or 100) for a duration of from 0.1 second (s) (e.g., from 1 second, from 2 seconds, from 5 seconds, from 10 seconds, from 30 seconds, from 1 minute, from 5 minutes, from 10 minutes, from 30 minutes, from 45 minutes) to 1 hour (h) (e.g., to 45 minutes, to 30 minutes, to 10 minutes, to 5 minutes, to 1 minute, to 30 seconds, to 10 seconds, to 5 seconds, to 2 seconds, or to 1 second). In some embodiments, the vortexing steps can each be at an rpm of from 100 to 5000 (e.g., 500 to 5000) for a period of 1 second to 10 min (e.g., from 1 second to 1 minute). In some embodiments, the ultrasonicating step is at a frequency of from 5 kHz (e.g., from 10 kHz, from 15 kHz, from 18 kHz, from 30 kHz, from 100 kHz, from 1 MHz, or from 30 MHz) to 50 MHz (e.g., to 30 MHz, to 1 MHz, to 100 kHz, to 30 kHz, to 18 kHz, to 15 kHz, or to 10 kHz) for a duration of from 1 second to 10 minutes (or from 1 second to 1 minute). In some embodiments, the ultrasonicating step is at a frequency of from 15 kHz to 30 MHz (e.g., 18 kHz to 100 kHz) for a duration of from 1 second to 10 minutes (or from 1 second to 1 minute).

Reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) can include agglomerating the fibers (e.g., nanofibers), which can be contemporaneous with the reaction between the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane). In some embodiments, the reacting and agglomerating can occur over a duration of from 0.1 second (e.g., from 1 second, from 10 seconds, from 1 minute, from 10 minutes, from 100 minutes, from 1,000 minutes, from 5,000, or from 7,000) to 10,000 minutes (e.g., to 7,000 minutes, to 5,000 minutes, to 1,000 minutes, to 100 minutes, to 10 minutes, to 1 minute, to 10 seconds, to 1 second). In certain embodiments, the reacting and agglomerating can occur over a duration of from 0.1 second to about 1440 minutes. In some embodiments, the reacting and agglomerating can occur over a duration of from 0.5 second to about 600 minutes.

In some embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a temperature of from 0° C. (e.g., from 10° C., from 20° C., from 30° C., from 50° C., from 75° C., from 100° C., from 125° C., from 150° C., or from 175° C.) to 200° C. (e.g., to 175° C., to 150° C., to 125° C., to 100° C., to 75° C., to 50° C., to 30° C., to 20° C., or to 10° C.), and/or at a pressure of from 10 kPa (e.g., 100 kPa, 1 mPa, or 5 mPa) to 10 mPa (e.g., 5 mPa, 1 mPa, or 100 kPa). In certain embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a temperature of from 10° C. to 100° C. In certain embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a temperature of from 18° C. to 80° C. In some embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at atmospheric pressure. In some embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a pressure of 50 kPa to 500 kPa. In certain embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a pressure of 80 kPa to 300 kPa. In some embodiments, reacting the water and the $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) to provide the fibers (e.g., nanofibers) and/or agglomerating the fibers (e.g., nanofibers) is conducted at a temperature of about 20° C. to 25° C., at 1 atmosphere (i.e., about 100 kPa).

Thus, the present disclosure describes a small amount of water mixed with bulk $C_{12}$-$C_{18}$ alkyltrihalosilane (or $C_6$-$C_{18}$ fluoroalkyltrihalosilane, or $C_{12}$-$C_{18}$ alkyltrihalosilane and $C_6$-$C_{18}$ fluoroalkyltrihalosilane) at a predetermined stoichiometric ratio to generate fibers (e.g., nanofibers) which in turn aggregate to form microparticles. The microparticles are then diluted and applied onto the surface of an article, for example, by dipping or spraying. In the present disclosure, the organosilane forms hierarchical micro/nanostructures with low surface tension in a single step. In some embodiments, the coatings of the present disclosure have a water contact angler of greater than or equal to 170°. Thus, the coatings of the present disclosure are different from existing coatings.

Methods of Making Coated Articles

The present disclosure features a method of coating an article to provide a coated hydrophobic or superhydrophobic article, including diluting a suspension of microparticles in an organic solvent to provide a dilution of microparticles; and applying the dilution of microparticles to a surface of an article to provide the coated hydrophobic or superhydrophobic article. Applying the dilution can include dipping the article in the dilution of microparticles, spraying the dilution of microparticles onto the surface of the article, painting the dilution of microparticles onto the surface of the article, and/or any method that can coat a surface of an article. The coated surface of the article can have superhydrophobicity (e.g., a water contact angle of greater than or equal to 150°; and can be resistant to mechanical abrasion, where the microparticle coating density does not decrease by more than 50% (e.g., by more than 40%, by more than 30%, by more than 20%, or by more than 10%) when subjected to sand abrasion (4.5 kJ) for 10 min, water jetting (90 kJ) for 10 min, tissue wiping for 20 times, and/or moving 50 cm linearly on sandpaper under a load of 2.5 kPa.

Unlike existing coating methods, in some embodiments, the coating methods of the present disclosure does not include coating a substrate with candle soot, the use of fluorinated compounds different than the $C_6$-$C_{18}$ fluoroalkyltrihalosilanes as described herein (e.g., polytetrafluoroethylene nanoparticles, perfluoropolyether, fluorinated amine), the use of an adhesive and/or resins (e.g., epoxy-resin-based adhesive), micro-pyramidal arrays, porous foams (e.g., copper foam), nano- and/or micro-silica, polydimethylsiloxane, a prepolymer and/or a curing agent, silica sols, waxes (e.g., carnauba wax), silica nanoparticles coated with organosilanes, and/or the formation of microscale features within a surface (e.g., by lithography, etching, or through the use of laser).

In some embodiments, the coatings of the present composition do not include a self-assembled monolayer on a surface, such as a self-assembled monolayer formed of organosilanes (e.g., an alkoxy silane) on a surface (e.g., a glass surface and/or a silicon surface); a coating formed by contacting a surface with a solution of organosilanes (e.g., an alkoxy silane that optionally does not include an organosiloxane); preforming micro/nano morphological structures on a surface before coating the surface with organosilanes; pre-functionalizing a surface with reactive groups, such as epoxide groups, then reacting the surface with particles, such as amino-functionalized silica particles, followed by coating with an organosilane to provide a coating; modifying preformed nanowire nanowall surfaces with an organosilane followed by a second coating of a hydrocarbon (e.g., n-octadecane) onto flat substrates; and/or coating preformed nanoparticles (e.g., silica nanoparticles) with one or more organosilanes, then using the coated nanoparticles in a coating formulation to provide a coating material.

In some embodiments, the coatings of the present disclosure do not require pretreatment of the underlying article before coating with coating formulation (e.g., pretreatment of wood with $FeSO_4$ and $CoCl_2$, followed by immersion in an organosilane); nor the use of adhesives such as epoxy resins; or pre-coating a surface with particles followed by treatment with an organosilane. In some embodiments, the coatings of the present disclosure do not require post-coating treatment of the coated article to provide a hydrophobic or superhydrophobic surface.

Compared to existing products for repelling water (e.g., Woods™ waterproof silicone spray, Grangers™ footwear repel, Woods™ instant waterproof spray, KIWI™ Protect-All™ leather & fabric footwear, Nikwax TX. direct spray-on, Scotchgard™ water shield heavy-duty water-repellent spray, KIWI™ camp dry heavy-duty water repellent, NeverWet®), the coating compositions of the present disclosure offer significant cost savings and greater hydrophobicity, as evidenced by the greater contact angle.

The Example below describe hydrophobic and superhydrophobic coatings and their characterizations.

EXAMPLE

Example 1: Functional and Versatile Superhydrophobic Coatings

In the present Example, octadecyltrichlorosilane (OTS) is the only reagent required other than water and a solvent (e.g., hexane) for coating fabrication. Its fluorine-free composition minimizes potential environmental and health hazards. Conventionally, chlorosilane derivatives are reputed to vigorously react with even trace amounts of water and create large aggregates that are futile for obtaining high-quality monolayer coatings. Thus, when adopting chlorosilanes for surface modification, a rigorously controlled humidity is generally required. However, for OTS, its $C_{18}$ long alkyl chain can sterically reduce the reaction rate when exposed to water or moisture. With the reaction being kinetically controllable, the present Example unorthodoxly harnesses the aggregation of OTS to create the desired surface coating upon reacting with a stoichiometric amount of water. Different from existing studies, the stoichiometric reaction between OTS and water explored herein not only creates the required hierarchical micro/nanostructures but also results in low surface tension. Superhydrophobicity can be achieved in a single step with an organotrihalosilane as the only precursor (vide infra) besides water and solvent for dilution. This present Example is conceptually different from conventional sol-gel processes, for which less-reactive organosilanes (e.g., tetraethoxysilane) were mixed with a bulk amount of water to create solid materials.

Sample Preparation

Figure 20:
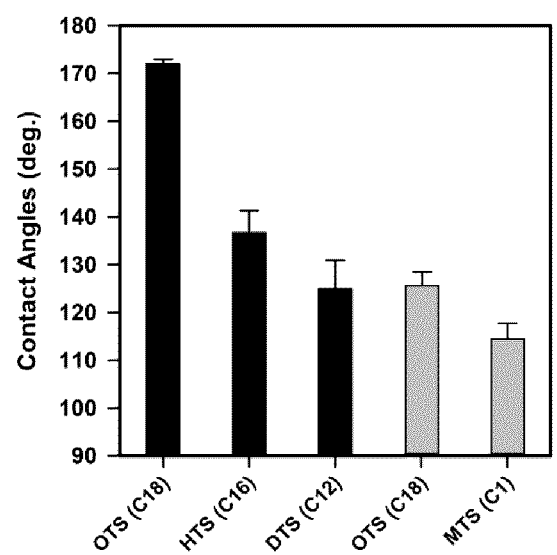
FIG. 20 is a graph showing the wetting property of Whatman grade 1 filter paper coated with embodiment of a coating formulation of the present disclosure, using alkyltrichlorosilanes of varying carbon chain lengths. The data for samples treated with OTS (Cis), hexadecyltrichlorosilane (HTS, $C_{16}$), and dodecyltrichlorosilane (DTS, $C_{12}$) following the stoichiometric silanization protocol are shown as black bars. For comparison, the contact angles of samples modified with OTS and methyltrichlorosilane (MTS) via conventional methods (see Example section) are shown as grey bars; specifically, they were immersed in a diluted solution of the respective alkyltrichlorosilane (0.1% v/v in hexane) for 10 min. While HTS ($C_{16}$) and DTS ($C_{14}$) worked well with the stoichiometric silanization protocol, the treated samples became hydrophobic (137±5° and 125±6°). Through the conventional method, on the other hand, OTS and MTS modified samples exhibited even lower contact angles of 129±3° and 115±3°, respectively.

For the initial preparation of the coating solution as described in FIG. 1A, 20 µL water was added to 1.0 mL pure OTS in a 1.7 mL microcentrifuge tube. The tube was then capped and immediately put on a vortex mixer (Fisher Scientific, Model 9454FIALUS) at 3200 rpm for 10 s, followed by sonication in an Ultrasonic cleaner (Aquaponic, Model 50T) for 10 s (uncapped) and another round of vortex mixing for 10 s (capped). Immediately after, 500 µL of the resulted emulsion was transferred to a 20 mL scintillation vial (with cap on but not airtight). After 2 h, 10 mL hexane was added to the vial and mixed by shaking before use.

For the surface modification, all solid substrates were cut into small pieces (1×3 cm²) and immersed in the coating solution prepared according to steps described herein for overnight. The treated sample was then removed from the solution and washed three times with hexane and then dried in air. For the spray coating experiments, all samples were used in their original form without any pretreatments besides washing with water and drying. An exemption is for glass samples, for which an additional cleaning step was performed with an UV-Ozone cleaner (PSD-UV, Novascan Technologies Inc.) for 30 min.

For the "gold-tracking" and chromophore encapsulation experiments, 60 mg chloroauric acid was dissolved in 100 μL water or 15 mg of rhodamine B was dissolved in 1.0 mL water; the prepared solution was then used in place of water in the steps described herein to prepare the coating solution.

For the large-scale preparation and for spray experiments, 200 μL deionized water was added to 10 mL of OTS in a glass vial. Followed by the same preparation procedures as described herein. After 2-h incubation of the mixture, the solution was diluted with 200 mL of mineral spirit. Then the solution was transferred to a plastic spray bottle. The spraying was performed herein the sample at a 30° angle toward the sample to be treated.

Sample Characterization

Photos and normal speed videos were captured with a Sony mirrorless digital camera (Alpha a7RII, Japan) with a Canon macro lens (EF 100 mm f/2.8 L IS USM, Japan). The slow-motion video was captured with a high-speed camera (Promon U750) from AOS Technologies AG (Baden, Switzerland).

Water contact angles (WCA) were measured with an optical goniometer (AST VCA system, Billerica, MA). A 1.0 μL droplet was held with a syringe needle, slowly moved down to contact the sample surface. At least three samples prepared under the same condition were tested; for each sample, 5 different regions were examined.

The morphology of the treated samples was imaged with a FEI Nova NanoSEM 430 system (FEI Company, Hillsboro, OR). The substrates were first sputtered with iridium (5 nm) with a Leica EM ACE600 (Wetzlar, Germany) deposition chamber to improve the conductivity. The cross-section view of the samples was obtained either using a FEI Strata DualBeam DB235 (FEI Company, Hillsboro, OR) or a FEI Helios NanoLab 650 SEM/FIB System. The substrates were coated with carbon (15 nm) in this case. During the imaging, the samples were tilted for 52° following by a gallium ion beam (30 pA) cutting for 15 min. Transmission electron microscopy (TEM) was carried out with a FEI Tecnai Osiris S/TEM (FEI Company, Hillsboro, OR) at 200 kV. The nanospheres were prepared as described herein, then dissolved in hexane and transferred to a Cu-grid for imaging.

Elemental analysis was acquired with an EDAX detector installed on the FEI Strata DualBeam DB235 system. The element mapping was performed using the EDAX detector installed on the FEI Helios NanoLab 650 SEM/FIB System (with the energy at 8 kV). XPS data were obtained on an Axis Ultra DLD spectrometer (Kratos Analytical, Manchester, UK), with a monochromatic aluminum source (Al Kα 1486.6 eV) at a power of 150 W (10 mA/15 kV). The FTIR spectrum was acquired with on a Perkin Elmer Spectrum Two Spectrometer with an ATR attachment. The dynamic light scattering (DLS) data were obtained using a Zetasizer Nano ZS system (model ZEN 3600) from Malvern Instruments, UK. The viscosity of OTS (14.674 mPa·s at 20° C.) was determined with a μVisc viscometer (RheoSense, Inc., San Ramon, CA); its refractive index (1.5122 at 532 nm) was determined with a Metricon refractometer (Model 2010/M, Pennington, NJ).

DISCUSSION

The coating mixture was prepared by directly reacting water with pure OTS, followed by dilution with hexane. As shown in FIG. 1A, the consecutive photos depicted a trial experiment of adding water to OTS with a mole ratio of 1:2, for example, 40 μL (2.2 micromole) of water was required for 2.0 mL of OTS (4.4 micromole), which was exactly ⅓ of the amount of water needed to complete the hydrolysis of OTS. The addition of water was followed by immediate mechanical mixing, including vortex and sonication. The mixture was then diluted with hexane (5% v/v OTS/hexane) before being applied on a number of solid surfaces (vide infra). Remarkably, the reaction between water and OTS was rather mild with minimal volume increase and gas (HCl) release. The modification of standard microscope glass slides, an intrinsically flat substrate, was first investigated. As shown in FIG. 1B, a 5.0 μL of water droplet stayed as a near-perfect sphere on the surface and easily slid off. The water contact angle of the modified glass was measured to be 172±1°, with an ultralow sliding angle of 0.7±0.2°. The surface was also tested dynamically with a 5.0 μL water droplet at a speed of 1 m/s (momentum energy of 2.5 μJ), and the droplet bounced off the surface freely without pinning onto it. As captured by a high-speed camera, a water droplet freely jumped from one side to the other side of the superhydrophobic glass slide. Apparently, both the ultrahigh water contact angle and ultralow sliding angle (minimum wetting hysteresis) warrant the excellent water-repellency (non-sticky property) of the coated (also referred to as modified herein) glass surface.

After modification, the glass slide was covered with a layer of uniform, microparticles with diameters ranging from 2 to 20 μm (FIG. 1B). The high-resolution SEM showed that these microparticles are, in fact, formed from entangled nanofibers (150 to 200 nm in diameter and 2 to 10 μm in length), which beautifully mimicked the micro-to-nanoscale hierarchical morphology on lotus leaves. More impressively, the hierarchical model could be adapted for simulating such an extreme hydrophobicity:

$$\cos \theta_{app} = f_s (L/l)^{D-2} \cos \theta - f_v \quad (1)$$

The value of D (fractal dimension) in three-dimensional space was 2.2618. For the modified glass surface (FIG. 1B), the average value of $f_s$ was estimated to be 0.2 ($f_v$=0.8), L is 10 μm and l being 175 nm. The calculated water contact angle was 171°, which matched the experimental determination very well (172±1°). This result affirmed that the extreme hydrophobicity of the modified surfaces should be attributed to the lotus-leaf like micro-to-nanoscale hierarchical roughness.

Figure 2:
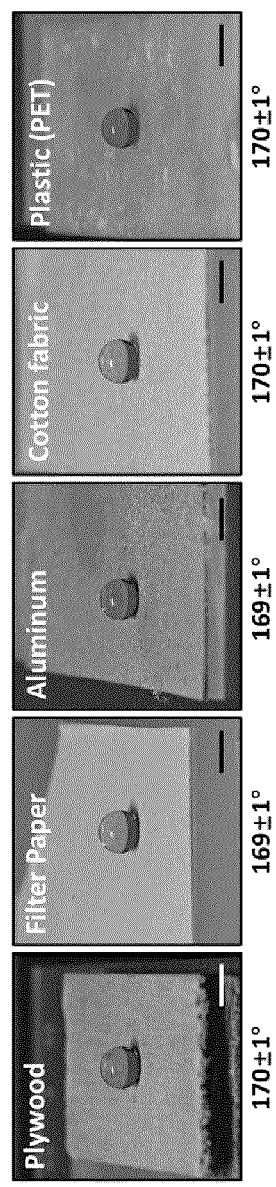
FIG. 2 is a series of photographs showing superhydrophobicity on a diverse set of solid materials that has been coated with an embodiment of a coating formulation of the present disclosure. The photographs show water droplets (7.0 µL) on the coated substrates. The value below each image is the corresponding water contact angle; the sliding angles of all modified samples are within 0.5° to 1.0°. All scale bars in the pictures are 2 mm.
Figure 5:
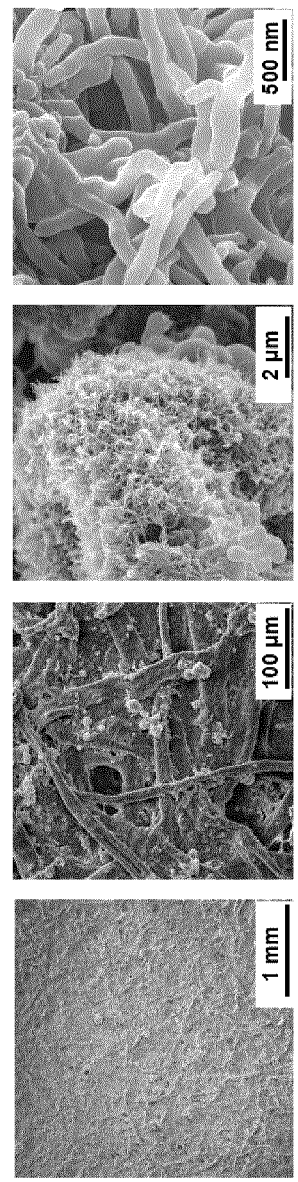
FIG. 5 is a series of SEM images at different magnifications of the morphology of a filter paper (Whatman™ grade 1) that has been coated with an embodiment of a coating formulation of the present disclosure. The cellulose fibers are coated with microparticles that are formed of entangled nanofibers, similar to those observed on treated glass slides (FIG. 1B).

Besides the glass surface discussed herein, the coating solution could be applied to many other different materials regardless of roughness, composition and rigidity. Particularly, the coating method described herein was demonstrated on (1) paper (laboratory filter paper), (2) fabric (100% cotton shirting fabric) (3) wood (maple plywood), (4) metal (aluminum thin sheet), and (5) plastics (polyethylene terephthalate, PET) as examples. As shown in FIG. 2, all solid substrates that were treated with the coating solution resulted in high water contact angles (168-171°) and very low sliding angles (0.5°-1.0°). The aforementioned micro-to-nanoscale hierarchical structure was also confirmed on other substrates (e.g., porous filter paper, FIG. 5). Their superior water-repellency property was further illustrated with a movie to show how water droplets bounce off these treated surfaces.

Figure 6B:
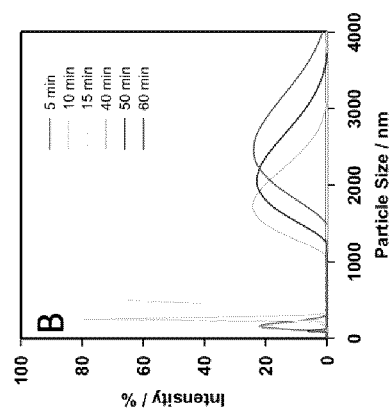
FIG. 6B is a graph showing the aggregated particle size vs. incubation time based on the dynamic light scattering (DLS) measurements of embodiments of microparticles of the present disclosure. The average particle size increased with the incubation time, which reached 2-3 µm in about an hour.
Figure 6A:
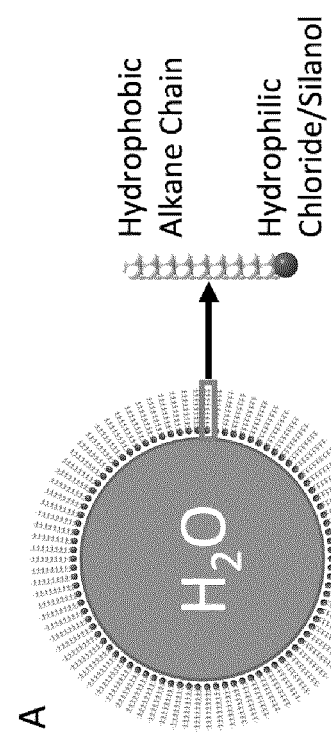
FIG. 6A is a schematic view of a micelle formed around a water microdroplet.
Figure 9:
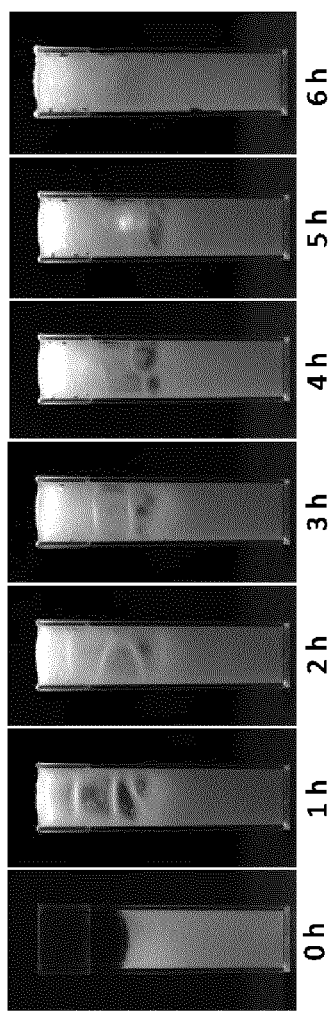
FIG. 9 is a series of photographs showing the continued reaction of an embodiment of a $C_{12}$-$C_{18}$ alkyltrihalosilane/water mixture at different incubation time periods. For better visualization, a 3 mL reaction mixture was transferred to a plastic cuvette. The reaction was initially fast, particularly for the first hour, with a noticeable amount of gas generated. The reaction slowed down after 2 h; at about 6 h, the reaction mixture became a gel, which was no longer dispersible in a solvent.

Besides the superior water-repellent property, the nature of such an unconventional alkylsilane/water reaction was intriguing. As shown in FIG. 3A, an important factor was the amount of water added to the OTS, i.e., at a molar ratio of 1:2 (water:OTS) the best performance was achieved. Less or more water could lead to a decrease in the water contact angle of the treated surface. As mentioned herein, this stoichiometrically-controlled hydrolysis and condensation of OTS was conceptually different from either the monolayer formation with long-chain alkylsilanes (which is performed under a strictly controlled humidity) or the conventional sol-gel processes (which mix less-reactive organosilanes with a bulk amount of water). Although the molar ratio between the two reactants was 1:2, the volume percent of water in the mixture was only ~2%. After applying mechanical dispersion, such a small amount of water mixed well with OTS and quickly decreased to submicron-to-nanometer sized droplets. This led to the formation of a stable and uniform water-OTS emulsion with the hydrophilic end of OTS molecules orienting towards water droplets and the hydrophobic chain facing outward (FIG. 6A). The continued hydrolysis and subsequent condensation of OTS consumed water and generated HCl gas, which created an acidic condition for further catalyzing the reaction. Consequently, spherical nanoparticles (100-200 nm) were formed with the surface covered with alkyl chains (FIG. 3D, FIG. 7A, and FIGS. 8A and 8B). Next, nanoparticles tend to form head-to-head linear fibers (FIG. 3E and FIG. 7B), because of the energy barriers encountered during aggregation. Then, linear fibers further aggregated and eventually formed microparticles (FIG. 3F, FIG. 6B, and FIG. 7C). This silanization reaction could last for approximately 6 h (FIG. 9), although the highest water contact angle (172°) was achieved after 2 h (FIG. 3B). The continued variation of the resulting water contact angles after this point indicated that the reaction was not complete, i.e., reactive sites (—Si—OH or —Si—Cl) on the particles still existed. Therefore, micro-aggregates could covalently bond to the substrates provided that hydroxyl groups are present, i.e., the particles would bond to the surface and form hierarchical structures. In FIG. 3F, the "FIB-cut" cross-section of a particle that was "anchored" on the substrate surface was shown (also shown in FIG. 7D and FIGS. 10A-10D).

Figure 10A:
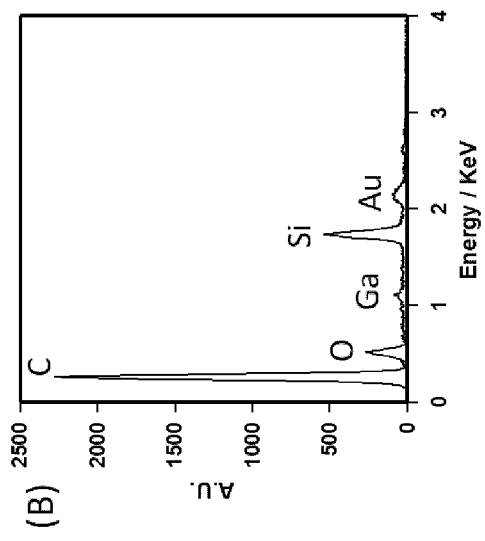
FIGS. 10A-10D are images and graphs of a "gold-tracking" study of the formation mechanism of an embodiment of microparticles of the present disclosure.
Figure 10B:
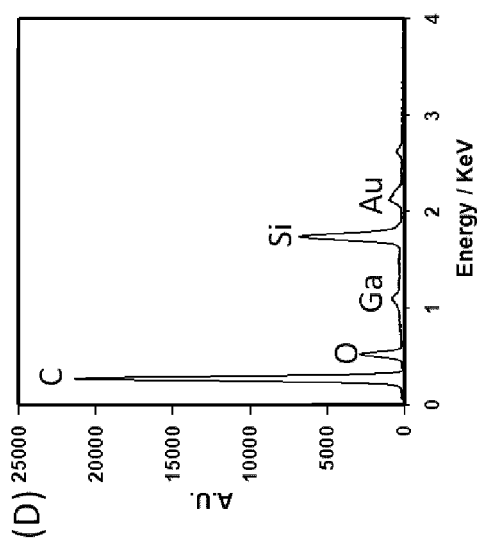
Figure 10C:
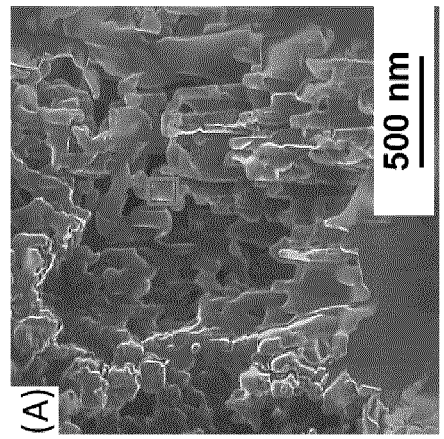
Figure 10D:
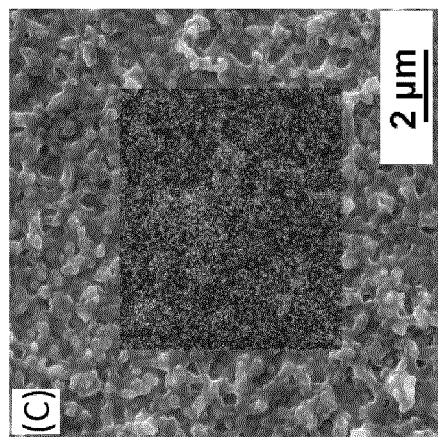
Figure 11:
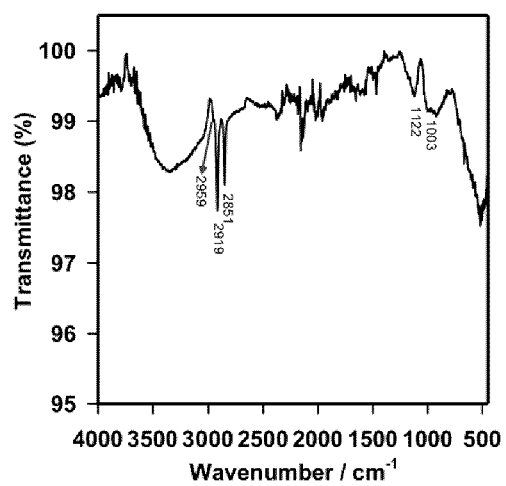
FIG. 11 is a Fourier-transform infrared (FT-IR) spectroscopic spectrum of an aluminum sample that has been coated with an embodiment of a coating formulation of the present disclosure. The peak at 1003 cm$^{-1}$ was attributed to the asymmetric stretch of Si—O—Al groups, which confirmed the formation of chemical bonds between the coating layer and the aluminum substrate. The asymmetric stretch of Si—O—Si group was located at 1122 cm$^{-1}$. Peaks at 2851 cm$^{-1}$ and 2919 cm$^{-1}$ were assigned to the symmetric and asymmetric stretching modes of —CH$_2$ groups from the long chain alkyl group of OTS, respectively. The relatively weaker peak at 2959 cm$^{-1}$ could be attributed to the asymmetric stretching of the —CH$_3$ groups (of OTS) on the coating surface.
Figure 12:
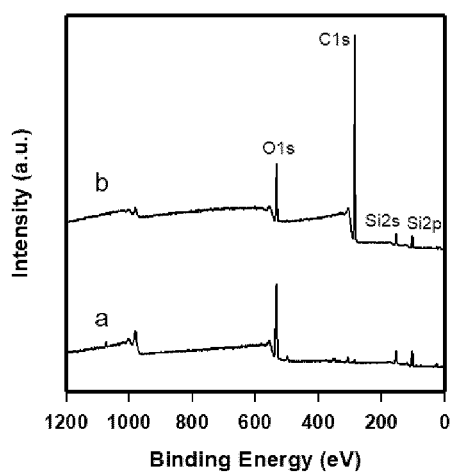
FIG. 12 is an XPS spectra of a glass slide before (a) and after (b) applying an embodiment of a coating formulation of the present disclosure. Analysis of these spectra showed that the C/O/Si atomic ratio changed from 7.41%/66.43%/26.16% to 86.37%/9.10%/4.53%. The significant increase in the C1s peak intensity confirmed the presence of OTS and its aggregates on the glass surface.

To examine the composition of the superhydrophobic coatings, Fourier transform infrared (FT-IR) spectroscopy and X-ray photoelectron spectrum (XPS) were acquired on modified aluminum and glass samples, respectively. The band at 1003 $cm^{-1}$ in the FTIR spectrum was due to the bending vibration of Si—O—Al, which verified the formation of chemical bonding on the surface (FIG. 11). For the XPS results, the C/O/Si atomic ratio changed from 7.41/66.43/26.16% to 86.37/9.10/4.53%. The significant increase in the CIs peak intensity after the modification confirmed the existence of OTS aggregates on the surface (FIG. 12). The hypothesis for the formation of the hierarchic structure was further confirmed by adding $HAuCl_4$ in water when preparing the coating mixture to trace the entire process. The existence of gold elements was detected in the emulsion and therefore verified the presence of water (FIGS. 10A and B) in the fibers formed from siloxane particles. Meanwhile, in between particles, the surface was covered with small particles (FIGS. 10C and 10D). The entire reaction was performed in a controlled manner. The other important fabrication step was the dilution of the stock solution (FIG. 1A), which could utilize common organic solvents (hexane or mineral spirit) of preference. As shown in FIG. 3C the optimal concentration of the dilution was determined to be 5.0% (v/v). This relatively low concentration enables the potential for large-scale fabrication of the coating.

Figures 4A, 4B:
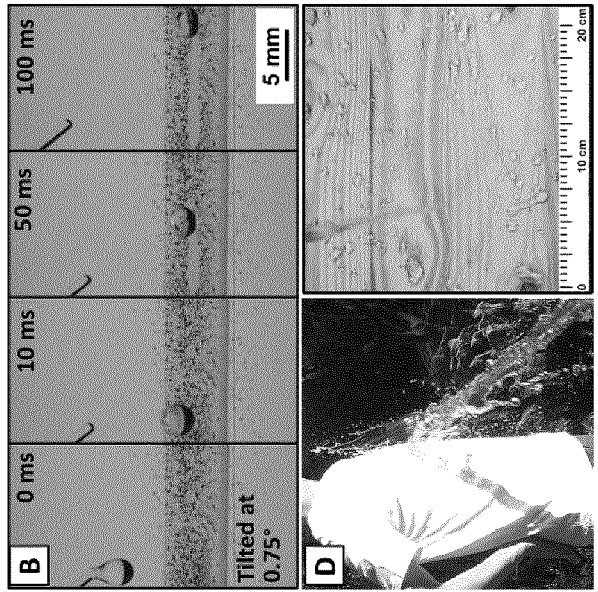
FIGS. 4A-4D are a series of photographs showing the encapsulation capability and real-life applicability of embodiments of the superhydrophobic coatings of the present disclosure.

As mentioned herein, gold nanoparticles could be encapsulated in the coating (FIGS. 10A-10D). To further test and visualize this capability, water-soluble fluorescent dye (Rhodamine B) was tested as a trial luminescent chromophore. The ring-open structure of Rhodamine B makes the molecule polar and soluble in water but not in organic solvents. The solution of Rhodamine B (30 mM), instead of pure water, was added to the OTS in the procedure mentioned herein (FIG. 1A) and the coating mixture was then applied onto laboratory filter paper. The resulted surface displayed a pink color under ambient light; the color remains after washing with water and organic solvents, which indicating that the dye molecules were not physically adsorbed on the surface. As shown in FIG. 4A, a water droplet (dyed with a different water-soluble fluorescent dye, pyranine) sat perfectly atop, which confirmed the unperturbed superhydrophobicity (FIG. 4A, left photo). It was more remarkable that under UV light ($\lambda$=254 nm), this superhydrophobic filter paper displayed bright red emission, while strong green fluorescence observed from the water droplet (right picture of FIG. 4A). The reflections from air bubbles trapped under the water droplet validated the Cassie-Baxter wetting state. The fact that the encapsulation of chromophores did not influence either ultrahigh water contact angle or the sliding angle, warranted application potentials such as designing colorful and luminescent waterproof coatings.

The other intriguing property of superhydrophobic surfaces was the self-cleaning capability, which could be adapted to various daily life scenarios such as building construction, clothing, and machining materials. In FIG. 4B, a series of photos taken at different timeframes demonstrated that a water droplet readily rolled off a slightly tilted (~0.75°) glass slide prepared as described herein and carried away dust (MnO particles) from the coated surface.

Figures 4C, 4D:
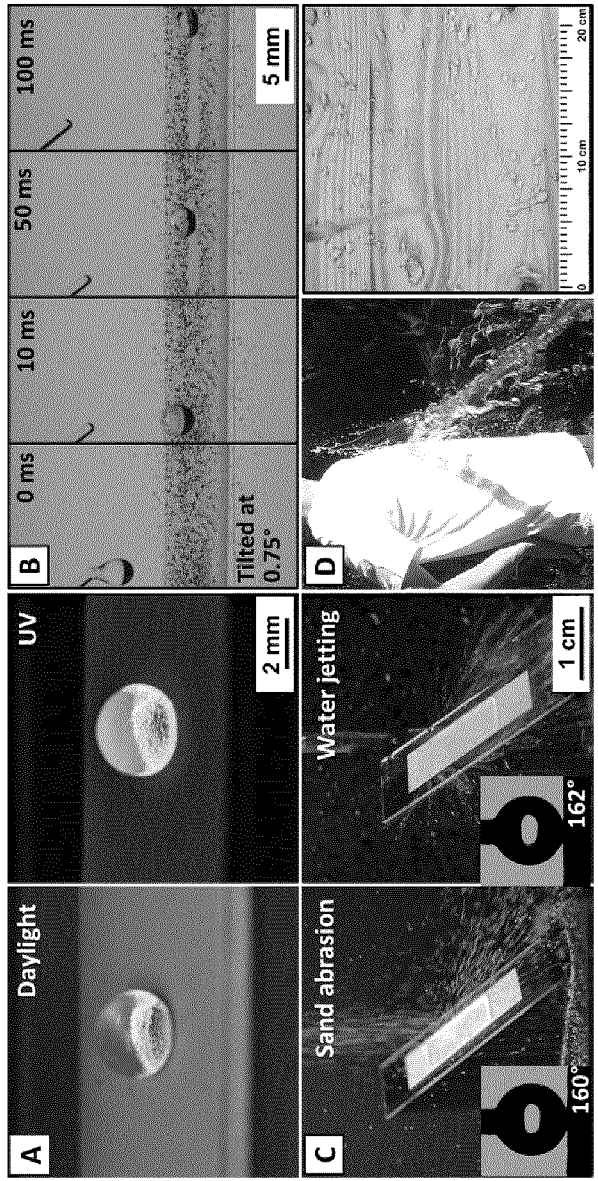
Figure 13:
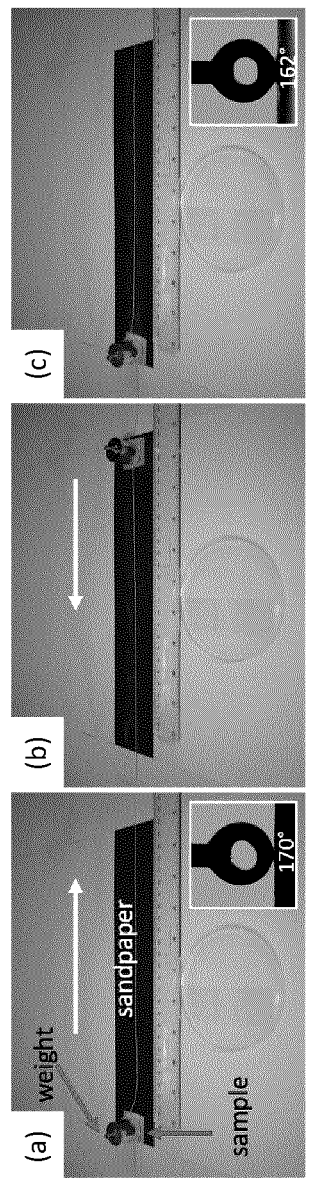
FIG. 13 is a series of photographs showing an abrasion test of a filter paper (grade 1) coated with an embodiment of a coating formulation of the present disclosure. A small piece of the coated paper (1×2 cm) was affixed at the bottom of a weight (50 g), which was then dragged on the surface of sandpaper (Grit No. 400). From (a) to (c) shows one round of abrasion (50 cm). Water contact angles were measured before (inset in (a)) and after (inset in (c)) the test.
Figure 14A:
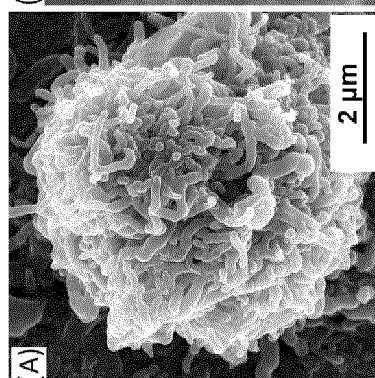
FIG. 14A is a SEM image showing a top view of an embodiment of microparticles of the present disclosure on a glass surface that has been coated with an embodiment of a coating formulation of the present disclosure, before FIB cutting.
Figure 14B:
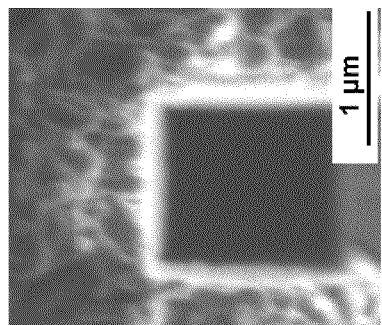
FIG. 14B is a SEM image showing a top view of an embodiment of microparticles shown in FIG. 14A, after FIB cutting.
Figure 14C:
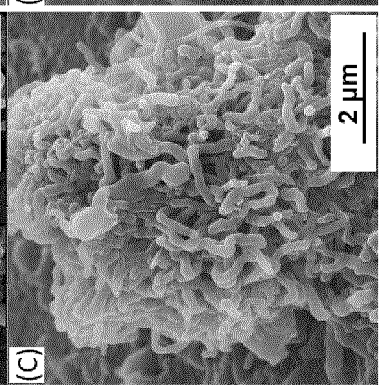
FIG. 14C is a SEM image showing a side view (tilted 52°) of microparticles on a glass surface that has been coated with an embodiment of a coating formulation of the present disclosure, before FIB cutting.
Figure 14D:
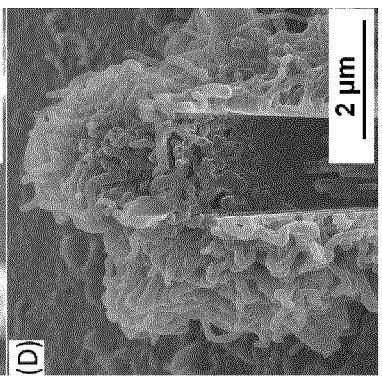
FIG. 14D is a SEM image showing a side view (tilted 52°) of an embodiment of microparticles shown in FIG. 14C, after FIB cutting.
Figure 16:
FIG. 16 is a schematic representation of the anti-abrasion property of a substrate that has been coated with an embodiment of a coating formulation of the present disclosure. The micro-to-nanoscale structure (light grey particles) remained similar to the original after abrasion and retained the hierarchical roughness of the surface (in turn retaining the superhydrophobicity).

In addition to the application versatility, mechanical stability was considered as a vital criterion for surface coatings. To apply the coating in daily life, superhydrophobic surfaces were desired to survive under harsh weather conditions. The mechanical stability of surface coatings was tested by sand abrasion and water jetting experiments. As shown in FIG. 4C, the modified superhydrophobic glass substrate remained superhydrophobic (>160°) after sand abrasion (4.5 kJ) for 10 min or water jetting (90 kJ) for 10 min. It was also confirmed that water immersing for three days and tissue wiping for 20 times did not change the surface hydrophobicity significantly (i.e., the water contact angle is maintained above 150°. An abrasion test, in which the modified glass substrate was pressed onto a piece of silicon carbide sandpaper (Grit No. 400) under a pressure of 2.5 kPa, and then abraded for a distance of 50 cm was also conducted (FIG. 13). The glass slide retained a high contact angle (161±2°) and a low sliding angle (~1°) after the abrasion test. Without wishing to be bound by theory, it is believed that such an exceptional anti-abrasion property could be explained by covalently bound siloxane aggregates on the surface. As shown in FIG. 3F and FIGS. 14A-14D, the SEM image with a FIB cut showed that the hierarchical particles and the solid substrate were "merged" together due to the continued formation of siloxane compounds (as discussed herein). The chemical bonding provided higher stability compared with physical adsorption or deposition, leading to the strengthened robustness of the superhydrophobic coating. In addition, the anti-abrasion property could be also attributed to the fiber-entangled porous structure of the micro-size particles. As illustrated with SEM imaging (FIGS. 15A-15D), the abrasion test partially removed entangled nanofibers at the top surface, but the substrate was still coated with similar hierarchical nano/microstructures. That is, the remaining structure resembled the original surface prior to abrasion (FIG. 16). Thus, the combination of chemical bonding and self-similar structural strategy could achieve the superior anti-abrasion property shown in the present Example. Such mechanically robust coating is useful for building and ship construction, and outdoor gear, which typically sustains harsh conditions from wind, rain, or wear and tear. Further, the coating is also thermally stable. After subjecting coated samples to 50° C. for two weeks, the water contact angle remained high, averaging 157.8°.

Figure 17A:
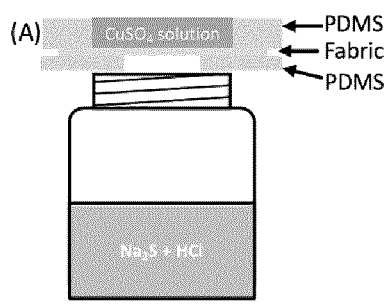
FIGS. 17A-17C is a scheme and photographs related to a gas permeation test of a cotton fabric that has been coated with an embodiment of a coating formulation of the present disclosure.
Figure 17B:
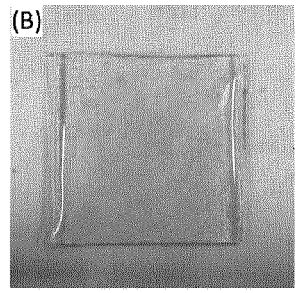
Figure 17C:
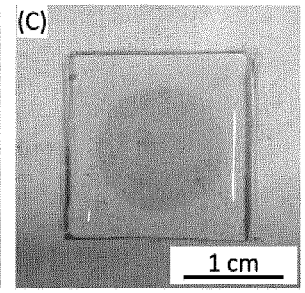

The coating method can be scaled industrially, which is a key factor in practice. To mimic the mass production of such coating in clothing industry, a cotton T-shirt was treated with the coating solution and exhibited an excellent water repellency (FIG. 4D). Water (with green dye) readily bounced off the surface, leaving the T-shirt clean and dry. It was noteworthy that the superhydrophobic fabrics retained good air permittivity, augmenting the potential to make commercial waterproof, breathable coating products from porous and flexible materials. FIGS. 17A-17C demonstrates gas penetration into a fabric, where the generated $H_2S$ gas could penetrate through the fabric, reach the other side of fabric, react with $CuSO_4$ and form the dark color CuS.

Figure 18:
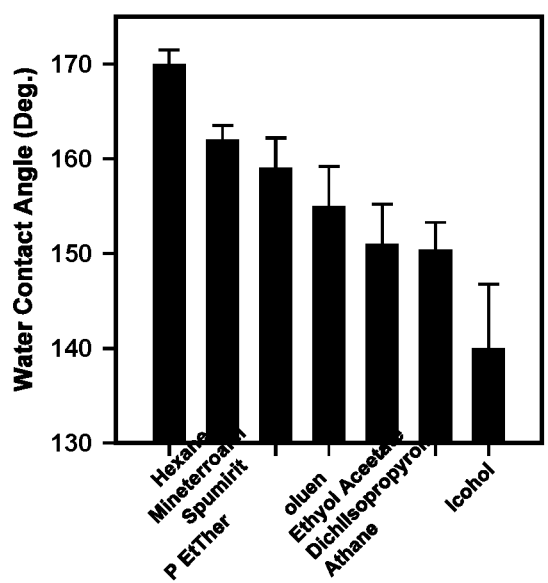
FIG. 18 is a graph comparing different solvents for diluting an embodiment of a coating mixture of the present disclosure. Water contact angles were measured on pieces of 1×3 $cm^2$ grade 1 filter paper that had been immersed for 2 h in the diluted coating mixture solutions (of different solvents as listed).

A comparison of two alternative application methods was carried out: dipping the substrate into the coating solution and spraying the coating solution onto the substrate. For any same type of solid materials, no significant differences were observed in the wetting performance when different methods were used to prepare the samples. Different organic solvents were tested (FIG. 18) were tested for the preparation of a spray solution, and it was found that the wetting performance was better using solvents with lower polarity. A widely used spray coating solvent, mineral spirit, was employed in an exemplary dilution step (FIG. 1A-4). The performance of the spray coated samples was compared with coating products from several commercial brands, namely Wood™, Grangers®, Kiwi®, Nikwax®, Neverwet™ and Scotchgard™, on glass and cotton fabrics. The surfaces treated with the coating solution of the present Example (sprayed and air dried for 2 h) showed superior waterproof properties, and superhydrophobicity was achieved on both types of material (162°-165°). On the other hand, the tested commercial products reached the level of hydrophobicity (900 to 120°). The coating solution was also sprayed on a large piece of pine wood (0.3 m×0.5 m) to further demonstrate the scale-up capability; as shown in FIG. 4D (right), water would not stick to the treated wood surface and ran off readily.

Figure 19:
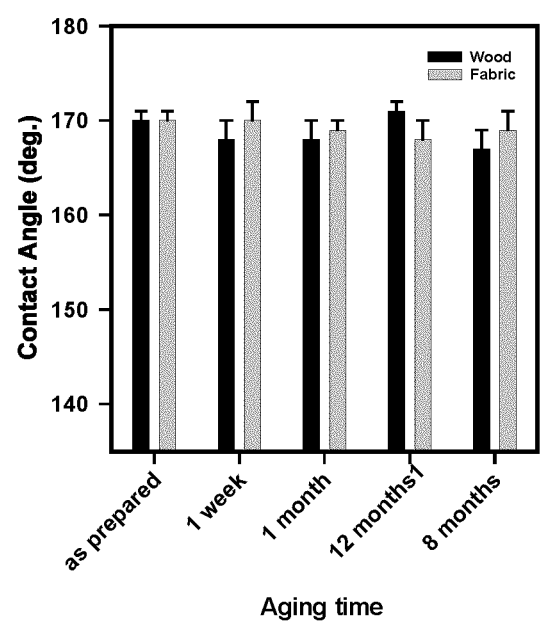
FIG. 19 is a graph showing the aging effect of plywood and cotton fabric samples that have been coated with an embodiment of a coating formulation of the present disclosure. Upon storage under ambient conditions for 18 months, there were no apparent changes in either water contact angle or the sliding angle.

The aging effect, anti-icing property, and cost-effectiveness of the coating solution were examined. After exposure to ambient conditions for 18 months, the coating applied on a number of surfaces demonstrated no sign of degradation. Particularly, treated cotton fabric and plywood samples tested after various periods of storage time consistently remained superhydrophobic (FIG. 19).

The cost for producing large waterproof surfaces with the present coating method was inexpensive since there were no intricate instrumentation nor expensive materials involved in the production process. It was estimated that more than 100 kg of the coating solution could be produced with a material cost of about 300 US$ and the production could be carried out per operator on a daily basis under ambient conditions. Furthermore, this new protocol is based on a simple, mild hydrolysis and condensation reaction of organosilanes. The only byproduct is HCl gas, which could be recycled for producing the precursor. Therefore, there is minimal environmental impact, and the simple synthesis and instrument-free production warrant large-scale industrial production.

Comparing with other state-of-the-art coating methods, the present method used only OTS and water to create hierarchical micro/nanostructure template with low surface tension in a single step and demonstrated superior wettability and anti-abrasion property compared to existing technology. In comparison, most other existing strategies relied on the modification of "pre-made" rough structures with low surface tension coatings. Therefore, with the present unique stoichiometric salinization approach the fabrication procedure is simplified, the chemical reagents are readily accessible, and the preparation is scalable for industrial applications.

Other alkyltrichlorosilanes were also tested to compare the resulting wetting property of treated samples with that of OTS. It was found that alkyltrichlorosilanes with slightly shorter chains, namely hexadecyltrichlorosilane (HTS, $C_{16}$) and dodecyltrichlorosilane (DTS, $C_{12}$), could be adapted with the same protocol developed for OTS to modify various solid substrates. The much shorter ones, such as methyltrichlorosilane (MTS), were more reactive and could be used with the exact same protocol. A summary of the resulting wettability for filter paper modified with alkyltrichlorosilanes of varying chain lengths was presented in FIG. 20. The stoichiometric silanization with HTS ($C_{16}$) and DTS ($C_{12}$) could modify filter papers to be hydrophobic (137±5° and 125±6°). The modification with other types of organosilanes (e.g., trichloro(1H,1H,2H,2H-perfluorooctyl)silane, trimethoxyoctadecylsilane) was explored as well, however, their hydrolysis reaction was too slow; for example, they could not effectively form micelles in the presence of the stochiometric amount of water.

Anti-icing property was investigated. The tests indicated that ice formed with the same amount of water (30 μL) had less contact with the modified superhydrophobic substrate (FIGS. 21A and 21B), the adhesive force decreased ~30%, from 895±69 kPa to 636±36 kPa. The present coating therefore exhibited anti-icing property.

In summary, the developed superhydrophobic coating technique, based on an unconventional, stoichiometrically controlled aggregation of organosilanes, was a versatile and practical method for surface modification at industrial scales for real-life applications. This protocol removed many limitations of existing waterproof coating methods, such as expensive materials and time-consuming preparation procedures.

By example and without limitation, embodiments are disclosed according to the following enumerated paragraphs:

A1. An article, comprising:
  a hydrophobic coating comprising a microparticle, wherein:
    the microparticle is disposed on and covalently bound to a surface of the article,
    the microparticle is porous and comprises a hierarchical morphology,
    the microparticle comprises an agglomerated plurality of fibers, and
    the fiber comprises a $C_{12}$-$C_{18}$ alkylhalosiloxane, a $C_6$-$C_{18}$ fluoroalkylhalosiloxane, or any combination thereof.

A2. The article of Paragraph A1, wherein the fiber consists essentially of the $C_{12}$-$C_{18}$ alkylhalosiloxane, or any combination thereof.

A3. The article of Paragraph A1, wherein the fiber comprises a $C_{12}$-$C_{18}$ alkylchlorosiloxane.

A4. The article of Paragraph A1, wherein the fiber comprises a $C_{18}$ alkylhalosiloxane.

A5. The article of Paragraph A1 or Paragraph A4, wherein the fiber comprises a $C_{18}$ alkylchlorosiloxane.

A6. The article of any one of Paragraphs A1, A2, and A4, wherein the $C_{12}$-$C_{18}$ alkylhalosiloxane or the $C_{18}$ alkylhalosiloxane comprises less than 3 halo substituents per Si atom.

A7. The article of any one of the preceding Paragraphs, wherein the fiber has an average diameter of from 50 nm to 10000 nm.

A8. The article of any one of the preceding Paragraphs, wherein the fiber comprises a nanofiber having an average diameter of from 50 nm to less than 1000 nm.

A9. The article of any one of the preceding Paragraphs, wherein the microparticle has an average diameter of from 0.1 μm to 1000 μm.

A10. The article of any one of the preceding Paragraphs, wherein the hydrophobic coating has a water contact angle of from 900 to 180°.

A11. The article of any one of the preceding Paragraphs, wherein the microparticle comprises pores having a maximum dimension of from 0.05 μm to 1 μm.

A12. The article of any one of the preceding Paragraphs, wherein the microparticle further encapsulates a small molecule.

A13. The article of any one of the preceding Paragraphs, wherein the coating comprises a density of from 1 to 10,000,000,000 microparticles per square centimeter.

A14. The article of any one of the preceding Paragraphs, wherein the fibers are physically entangled and chemically crosslinked.

A15. The article of any one of the preceding Paragraphs, wherein the surface comprises fabric, glass, wood, plastic, metal, leather, suede, fiberglass, or any combination thereof.

A16. The article of any one of the preceding Paragraphs, wherein the article is self-cleaning.

A17. The article of any one of the preceding Paragraphs, wherein the article comprises a fabric and is permeable to gas (e.g., water vapor).

A18. A hydrophobic coating formulation, comprising:
a suspension, comprising a microparticle suspended in a continuous phase,
wherein
the microparticle is porous and comprises a hierarchical morphology,
the microparticle comprises an agglomerated plurality of fibers, and
the fiber comprises a $C_{12}$-$C_{18}$ alkylhalosiloxane, a $C_6$-$C_{18}$ fluoroalkylhalosiloxane, or any combination thereof; and
wherein the continuous phase comprises an organic solvent, an alkyltrihalosilane, or a combination thereof.

A19. A method of making a hydrophobic coating, comprising:
providing a mixture of water, and a $C_{12}$-$C_{18}$ alkyltrihalosilane and/or a $C_6$-$C_{18}$ fluoroalkyltrihalosilane;
mixing the mixture to provide an emulsion of nanodroplets comprising a diameter of from 1 nm to 1000 nm;
reacting the water, and the $C_{12}$-$C_{18}$ alkyltrihalosilane and/or a $C_6$-$C_{18}$ fluoroalkyltrihalosilane in the mixture to provide a plurality of fibers comprising $C_{12}$-$C_{18}$ alkylhalosiloxane and/or $C_6$-$C_{18}$ fluorohalosiloxane; and
agglomerating the plurality of fibers to provide porous microparticles suspended in $C_{12}$-$C_{18}$ alkyltrihalosilane and/or $C_6$-$C_{18}$ fluoroalkyltrihalosilane.

A20. The method of Paragraph A19, wherein the emulsion comprises water nanodroplets in a continuous phase of the $C_{12}$-$C_{18}$ alkyltrihalosilane.

A21. The method of Paragraph A19 or Paragraph A20, wherein the mixture comprises a mole ratio of from 0.01:1 to 10:1 water:$C_{12}$-$C_{18}$ alkyltrihalosilane.

A22. The method of any one of Paragraph A19 to Paragraph A21, wherein the mixture comprises a mole ratio of 1:2 water:$C_{12}$-$C_{18}$ alkyltrihalosilane.

A23. The method of any one of Paragraphs A19 to A22, wherein the mixture comprises from 0.01% to 10% by volume of water in $C_{12}$-$C_{18}$ alkyltrihalosilane.

A24. The method of any one of Paragraph A19 to Paragraph A23, wherein the mixture comprises 2% by volume of water in $C_{12}$-$C_{18}$ alkyltrihalosilane.

A25. The method of any one of Paragraph A19 to Paragraph A24, wherein mixing the mixture comprises one or more steps of vortexing at an rpm of from 10 to 10000 for a duration of from 0.1 s to 1 h, one or more steps of ultrasonicating at a frequency of 5 kHz to 50 MHz for a duration of from 0.1 s to 1 h, or a combination thereof.

A26. The method of any one of Paragraph A19 to Paragraph A25, wherein mixing the mixture comprises vortexing at an rpm of from 100 to 10000 for a duration of from 0.1 s to 1 h, ultrasonicating at a frequency of 5 kHz to 50 MHz for a duration of from 0.1 s to 1 h, then vortexing the mixture at an rpm of from 10 to 10,000 for a duration of from 0.1 s to 1 h.

A27. The method of any one of Paragraph A19 to Paragraph A26, wherein the steps of reacting the water and the $C_{12}$-$C_{18}$ alkyltrihalosilane to provide the fibers and agglomerating the fibers together occur over a duration for from 0.1 second to 10,000 minutes.

A28. The method of any one of Paragraph A19 to A27, wherein the steps of reacting the water and the $C_{12}$-$C_{18}$ alkyltrihalosilane to provide the fibers and/or agglomerating the fibers is conducted at a temperature of 0° C. to 200° C., at a pressure of from 10 kPa to 10 mPa.

A29. The method of any one of Paragraph A19 to A28, wherein the steps of reacting the water and the $C_{12}$-$C_{18}$ alkyltrihalosilane to provide the fibers and/or agglomerating the fibers is conducted at a temperature of about 20° C. to 25° C., at 1 atmosphere.

A30. A method of making a hydrophobic article, comprising:
diluting a suspension of microparticles of any one of Paragraph A18 to A29 in an organic solvent to provide a dilution of microparticles; and
applying the dilution of microparticles to a surface of an article to provide the hydrophobic article.

A31. The method of Paragraph A30, wherein applying the dilution comprises dipping the article in the dilution of microparticles, spraying the dilution of microparticles onto the surface of the article, painting the dilution of microparticles onto the surface of the article, or any combination thereof.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. An article, comprising:
a hydrophobic coating comprising a microparticle, wherein:
the microparticle is disposed on and covalently bound to a surface of the article, the microparticle is porous and comprises a hierarchical morphology, the microparticle comprises an agglomerated plurality of fibers, and the fiber comprises a $C_{12}$-$C_{18}$ alkylhalosiloxane, a $C_6$-$C_{18}$ fluoroalkylhalosiloxane, or any combination thereof.

2. The article of claim 1, wherein the fiber consists essentially of the $C_{12}$-$C_{18}$ alkylhalosiloxane, or any combination thereof.

3. The article of claim 1, wherein the fiber comprises a $C_{12}$-$C_{18}$ alkylchlorosiloxane.

4. The article of claim 1, wherein the fiber comprises a $C_{18}$ alkylhalosiloxane.

5. The article of claim 1, wherein the fiber comprises a $C_{18}$ alkylchlorosiloxane.

6. The article of claim 1 wherein the $C_{12}$-$C_{18}$ alkylhalosiloxane or the $C_{18}$ alkylhalosiloxane comprises less than 3 halo substituents per Si atom.

7. The article of claim 1, wherein the fiber has an average diameter of from 50 nm to 10000 nm.

8. The article of claim 1, wherein the fiber comprises a nanofiber having an average diameter of from 50 nm to less than 1000 nm.

9. The article of claim 1, wherein the microparticle has an average diameter of from 0.1 μm to 1000 μm.

10. The article of claim 1, wherein the hydrophobic coating has a water contact angle of from 90° to 180°.

11. The article of claim 1, wherein the microparticle comprises pores having a maximum dimension of from 0.05 μm to 1 μm.

12. The article of claim 1, wherein the microparticle further encapsulates a small molecule.

13. The article of claim 1, wherein the coating comprises a density of from 1 to 10,000,000,000 microparticles per square centimeter.

14. The article of claim 1, wherein the fibers are physically entangled and chemically crosslinked.

15. The article of claim 1, wherein the surface comprises fabric, glass, wood, plastic, metal, leather, suede, fiberglass, or any combination thereof.

16. The article of claim 1, wherein the article is self-cleaning.

17. The article of claim 1, wherein the article comprises a fabric and is permeable to gas.

18. A hydrophobic coating formulation, comprising:
a suspension, comprising a microparticle suspended in a continuous phase,
wherein
the microparticle is porous and comprises a hierarchical morphology,
the microparticle comprises an agglomerated plurality of fibers, and
the fiber comprises a $C_{12}$-$C_{18}$ alkylhalosiloxane, a $C_6$-$C_{18}$ fluoroalkylhalosiloxane, or any combination thereof; and
wherein the continuous phase comprises an organic solvent, an alkyltrihalosilane, or a combination thereof.

19. A method of making a hydrophobic article, comprising:
diluting the suspension of microparticles of claim 18 in an organic solvent to provide a dilution of microparticles; and
applying the dilution of microparticles to a surface of an article to provide the hydrophobic article.

20. The method of claim 19, wherein applying the dilution comprises dipping the article in the dilution of microparticles, spraying the dilution of microparticles onto the surface of the article, painting the dilution of microparticles onto the surface of the article, or any combination thereof.

21. A method of making a hydrophobic coating, comprising:
providing a mixture of water, and a $C_{12}$-$C_{18}$ alkyltrihalosilane and/or a $C_6$-$C_{18}$ fluoroalkyltrihalosilane;
mixing the mixture to provide an emulsion of nanodroplets comprising a diameter of from 1 nm to 1000 nm;
reacting the water, and the $C_{12}$-$C_{18}$ alkyltrihalosilane and/or $C_6$-$C_{18}$ fluoroalkyltrihalosilane in the mixture to provide a plurality of fibers comprising $C_{12}$-$C_{18}$ alkylhalosiloxane and/or $C_6$-$C_{18}$ fluoroalkylhalosiloxane; and
agglomerating the plurality of fibers to provide porous microparticles suspended in $C_{12}$-$C_{18}$ alkyltrihalosilane and/or $C_6$-$C_{18}$ fluoroalkyltrihalosilane.

22. The method of claim 21, wherein the emulsion comprises water nanodroplets in a continuous phase of the $C_{12}$-$C_{18}$ alkyltrihalosilane.

23. The method of claim 21, wherein the mixture comprises a mole ratio of from 0.01:1 to 10:1 water: $C_{12}$-$C_{18}$ alkyltrihalosilane.

24. The method of claim 21, wherein the mixture comprises a mole ratio of 1:2 water: $C_{12}$-$C_{18}$ alkyltrihalosilane.

25. The method of claim 21, wherein the mixture comprises from 0.01% to 10% by volume of water in $C_{12}$-$C_{18}$ alkyltrihalosilane.

26. The method of claim 21, wherein the mixture comprises 2% by volume of water in $C_{12}$-$C_{18}$ alkyltrihalosilane.

27. The method of claim 21, wherein mixing the mixture comprises one or more steps of vortexing at an rpm of from 10 to 10,000 for a duration of from 0.1 s to 1 h, one or more steps of ultrasonicating at a frequency of 5 kHz to 50 MHz for a duration of from 0.1 s to 1 h, or a combination thereof.

28. The method of claim 21, wherein mixing the mixture comprises vortexing at an rpm of from 100 to 10,000 for a duration of from 0.1 s to 1 h, ultrasonicating at a frequency of 5 kHz to 50 MHz for a duration of from 0.1 s to 1 h, then vortexing the mixture at an rpm of from 10 to 1000 for a duration of from 0.1 s to 1 h.

29. The method of claim 21, wherein the steps of reacting the water and the $C_{12}$-$C_{18}$ alkyltrihalosilane to provide the fibers and agglomerating the fibers together occur over a duration for from 0.1 second to 10,000 minutes.

30. The method of claim 21, wherein the steps of reacting the water and the $C_{12}$-$C_{18}$ alkyltrihalosilane to provide the fibers and/or agglomerating the fibers is conducted at a temperature of 0° C. to 200° C., at a pressure of from 10 kPa to 10 mPa.

31. The method of claim 21, wherein the steps of reacting the water and the $C_{12}$-$C_{18}$ alkyltrihalosilane to provide the fibers and/or agglomerating the fibers is conducted at a temperature of about 20° C. to 25° C., at 1 atmosphere.

* * * * *